United States Patent
Fujii

(10) Patent No.: US 12,311,431 B2
(45) Date of Patent: May 27, 2025

(54) CONTROL DEVICE, CONTROL SYSTEM, AND CONTROL METHOD FOR WIRE STRAIGHTENER

(71) Applicant: OMRON Corporation, Kyoto (JP)

(72) Inventor: Takashi Fujii, Kyoto (JP)

(73) Assignee: OMRON CORPORATION, Kyoto (JP)

( * ) Notice: Subject to any disclaimer, the term of this patent is extended or adjusted under 35 U.S.C. 154(b) by 261 days.

(21) Appl. No.: 17/993,274

(22) Filed: Nov. 23, 2022

(65) Prior Publication Data

US 2023/0173573 A1    Jun. 8, 2023

(30) Foreign Application Priority Data

Dec. 6, 2021 (JP) ................. 2021-197682

(51) Int. Cl.
| | |
|---|---|
| B21F 23/00 | (2006.01) |
| B21C 51/00 | (2006.01) |
| B21F 1/02 | (2006.01) |
| G05B 13/02 | (2006.01) |
| G05B 13/04 | (2006.01) |
| G06F 17/15 | (2006.01) |

(52) U.S. Cl.
CPC ............... *B21F 23/00* (2013.01); *B21F 1/02* (2013.01)

(58) Field of Classification Search
CPC .. B21F 23/00; B21F 1/02; B21F 1/026; B21C 51/00
See application file for complete search history.

(56) References Cited

U.S. PATENT DOCUMENTS

| | | | |
|---|---|---|---|
| 2010/0095727 A1 | 4/2010 | Boeuf et al. | |
| 2024/0207921 A1* | 6/2024 | Muehlenfeld | ............ B21D 3/05 |

FOREIGN PATENT DOCUMENTS

| | | | | |
|---|---|---|---|---|
| CN | 107894711 B | | 7/2020 | |
| JP | 2016-196037 A | | 11/2016 | |
| WO | WO-2018167029 A1 * | | 9/2018 | ............... B21D 1/02 |
| WO | 2021/053265 A1 | | 3/2021 | |

OTHER PUBLICATIONS

English translate (WO2018167029A1), retrieved date Sep. 10, 2024.*
Extended European Search Report dated Apr. 26, 2023 in Application No. 22209312.2.

* cited by examiner

Primary Examiner — Mohammed S. Alawadi
(74) Attorney, Agent, or Firm — Sughrue Mion, PLLC

(57) ABSTRACT

Accuracy of feedforward control for a wire straightener is improved. A feedback operation amount to a straightener is determined by a feedback control means based on an error between a target curvature and a straightening curvature. A feedforward compensation means determines a feedforward compensation value from a measurement value of the straightener using a prediction model. A learning means performs machine learning on the prediction model using teaching data. The learning means adds at least one combination including the measurement value and a manipulated variable when an absolute value of an error is smaller than a reference value to the teaching data.

10 Claims, 16 Drawing Sheets

CONTROL DEVICE, CONTROL SYSTEM, AND CONTROL METHOD FOR WIRE STRAIGHTENER

BACKGROUND OF THE INVENTION

Field of the Invention

The present disclosure relates to a control device, a control system, and a control method for a wire straightener.

Description of the Background Art

Conventionally, a configuration controlling a wire straightener is known. For example, Japanese Patent Laying-Open No. 2016-196037 discloses a wire straightening device that individually moves a straightening roller to a position at which deformation of a wire is straightened based on information about the deformation of the wire. According to the wire straightening device, in straightening the wire, a burden of straightening adjustment can be eliminated during an actual operation while accurate straightening is automatically performed.

SUMMARY OF THE INVENTION

In the wire straightening device disclosed in Japanese Patent Laying-Open No. 2016-196037, the position of the straightening roller is changed according to a deformation amount (straightening curvature) of the straightened wire (feedback control). The position of the straightening roller is changed according to a bobbin winding position (feedforward compensation). In the feedforward compensation, the movement amount of the straightening roller is expressed as a linear expression of the bobbin winding position. However, the movement amount of the straightening roller is not uniform with respect to the bobbin winding position, and sometimes is not expressed as a linear expression of the bobbin winding position. The bobbin winding position that determines the initial curvature of the wire is only one of factors that affect the straightening curvature. In Japanese Patent Laying-Open No. 2016-196037, variations of factors affecting a straightening curvature other than the bobbin winding position are not considered.

The present disclosure has been made to solve the above problems, and an object of the present disclosure is to improve accuracy of feedforward control for the wire straightener.

A control device of a straightener according to one aspect of the present disclosure determines a feedforward compensation value corresponding to a feedback operation amount to a straightener such that a straightening curvature of a wire straightened by the straightener approaches a target curvature. The straightener includes a wire supply unit, a plurality of rollers, and a wire moving unit. The wire supply unit includes a wound wire. The plurality of rollers are alternately disposed so as to sandwich the wire drawn out from the wire supply unit, and press the wire. The wire moving unit pulls out the wire from the wire supply unit, and allows the wire to pass through the plurality of rollers. The straightening curvature is a curvature of the first part of the wire that has passed through the plurality of rollers. The feedback operation amount is determined by a feedback control means based on an error between the target curvature and the straightening curvature. A sum of the feedback operation amount and the feedforward compensation value is output to the straightener as an operation amount. The control device includes a feedforward compensation means and a learning means. The feedforward compensation means determines a feedforward compensation value from a measurement value obtained from the straightener, using a predictive model. The learning means performs machine learning on the prediction model using teaching data. The learning means acquires at least one first combination including the target curvature, the operation amount corresponding to the target curvature, the measurement value, and the straightening curvature corresponding to both the measurement value and the operation amount. The learning means adds at least one second combination in the at least one first combination to the teaching data. The at least one second combination includes the measurement value and the operation amount when an absolute value of the error is smaller than a first reference value.

According to this disclosure, the teaching data is selected from the result of the feedforward control, so that the prediction model can be adapted in real time to the measurement value and the characteristic of the straightener in parallel with the feedforward control. As a result, the accuracy of the feedforward control on the straightener can be improved.

In the above disclosure, the operation amount may change at least one of the positions of the plurality of rollers and a moving speed of the wire. The control device acquires at least one of the moving speed of the wire, a position of the first part, a position of a second part of the wire before being pressed by the plurality of rollers, a dimension of the second part before being pressed by the plurality of rollers, a curvature of the second part before being pressed by the plurality of rollers, a winding position of the wire in the wire supply unit, a position of each of the plurality of rollers, a radius of each of the plurality of rollers, a pitch of the plurality of rollers, and pressure of the plurality of rollers, from the measurement value.

According to this disclosure, the prediction model is optimized based on various factors that affect the straightening curvature. As a result, the accuracy of the feedforward control on the straightener can be further improved.

In the above disclosure, the learning means may calculate an average value of the operation amount when an absolute value of the measurement value is smaller than the second reference value in the teaching data. The learning means may approximate a relationship, between the measurement value and the feedforward compensation value that is a difference between the operation amount and the average value, which is expressed by the prediction model, as a function in which the feedforward compensation value is set to an objective variable while the measurement value is set to an explanatory variable. In third combinations, the absolute value of the measurement value is larger than the second reference value in the at least one first combination. In fourth combinations, the absolute value of the measurement value is larger than the second reference value in the at least one second combination. The learning means may end the machine learning when a ratio of a number of the fourth combinations to a number of the third combinations is larger than a third reference value.

According to this disclosure, the machine learning is continued until the accuracy of the prediction model becomes sufficiently high, so that the accuracy of the feedforward control for the straightener can be sufficiently improved.

In the above disclosure, the learning means may calculate an average value of operation amounts when an absolute value of the measurement value is smaller than the second reference value in the teaching data. The learning means may approximate a relationship, between the measurement value and the operation amount, which is expressed by the prediction model, as a function in which the operation amount is set to an objective variable while the measurement value is set to an explanatory variable. In third combinations, the absolute value of the measurement value is larger than the second reference value in the at least one first combination. In fourth combinations, the absolute value of the measurement value is larger than the second reference value in the at least one second combination. The learning means may end the machine learning when a ratio of a number of the fourth combinations to a number of the third combinations is larger than a third reference value. The feedforward compensation means may determine a value obtained by subtracting the average value from the operation amount predicted from the measurement value by the prediction model as the feedforward compensation value.

According to this disclosure, the machine learning is continued until the accuracy of the prediction model becomes sufficiently high, so that the accuracy of the feedforward control for the straightener can be sufficiently improved.

In the above disclosure, the learning means may resume the machine learning when the machine learning ends and when the ratio is smaller than the third reference value.

According to this disclosure, the prediction model is readapted to the characteristic according to the change in the characteristic of the straightener, so that a decrease in the accuracy of the feedforward control due to the change in the characteristic of the straightener can be prevented.

A control system according to another aspect of the present disclosure outputs a sum of a feedback operation amount to a straightener and a feedforward compensation value to the straightener as an operation amount such that a straightening curvature of a wire straightened by the straightener approaches a target curvature. The straightener includes a wire supply unit, a plurality of rollers, and a wire moving unit. The wire supply unit includes a wound wire. The plurality of rollers are alternately disposed so as to sandwich the wire drawn out from the wire supply unit, and press the wire. The wire moving unit pulls out the wire from the wire supply unit, and allows the wire to pass through the plurality of rollers. The straightening curvature is a curvature of the part of the wire that has passed through the plurality of rollers. The control system includes a feedback control device and a learning device. The feedback control device determines the feedback operation amount based on an error between the target curvature and the straightening curvature. The feedforward compensation device determines the feedforward compensation value from a measurement value obtained from the straightener using a predictive model. The learning device performs machine learning on the prediction model using the teaching data. The learning device acquires at least one first combination including the target curvature, the operation amount corresponding to the target curvature, the measurement value, and the straightening curvature corresponding to both the measurement value and the operation amount. The learning device adds at least one second combination in the at least one first combination to the teaching data. The at least one second combination includes the measurement value and the operation amount when an absolute value of the error is smaller than a first reference value.

According to this disclosure, the teaching data is selected from the result of the feedforward control, so that the prediction model can be adapted in real time to the measurement value and the characteristic of the straightener in parallel with the feedforward control. As a result, the accuracy of the feedforward control on the straightener can be improved.

A control method according to another aspect of the present disclosure is a method of controlling a straightener that determines a feedforward compensation value corresponding to a feedback operation amount to the straightener such that a straightening curvature of a wire straightened by the straightener approaches a target curvature. The straightener includes a wire supply unit, a plurality of rollers, and a wire moving unit. The wire supply unit includes a wound wire. The plurality of rollers are alternately disposed so as to sandwich the wire drawn out from the wire supply unit, and press the wire. The wire moving unit pulls out the wire from the wire supply unit, and allows the wire to pass through the plurality of rollers. The straightening curvature is a curvature of the part of the wire that has passed through the plurality of rollers. The feedback operation amount is determined by a feedback control means based on an error between the target curvature and the straightening curvature. A sum of the feedback operation amount and the feedforward compensation value is output to the straightener as an operation amount. The control method includes: determining the feedforward compensation value from a measurement value obtained from the straightener using a predictive model; and performing machine learning on the prediction model using teaching data. The performing the machine learning: acquiring at least one first combination including the target curvature, the operation amount corresponding to the target curvature, the measurement value, and the straightening curvature corresponding to both the measurement value and the operation amount; and adding at least one second combination in the at least one first combination to the teaching data, the at least one second combination including the measurement value and the operation amount when an absolute value of the error is smaller than a first reference value.

According to this disclosure, the teaching data is selected from the result of the feedforward control, so that the prediction model can be adapted in real time to the measurement value and the characteristic of the straightener in parallel with the feedforward control. As a result, the accuracy of the feedforward control on the straightener can be improved.

The foregoing and other objects, features, aspects and advantages of the present invention will become more apparent from the following detailed description of the present invention when taken in conjunction with the accompanying drawings.

DESCRIPTION OF THE PREFERRED EMBODIMENTS

Figure 1:
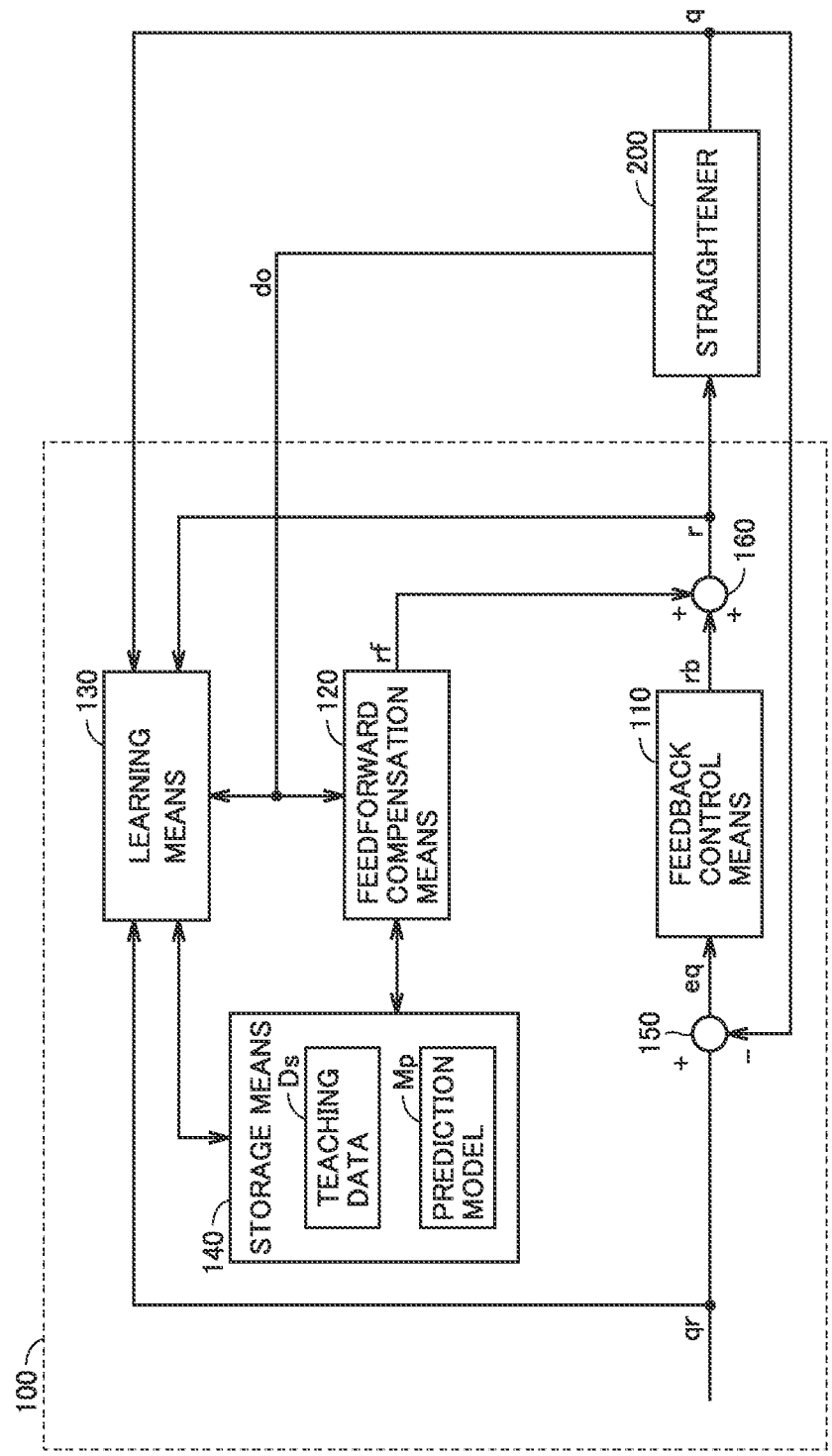
FIG. 1 is a block diagram illustrating a functional configuration of a control device of a wire straightener according to a first embodiment.

Hereinafter, embodiments of the present invention will be described in detail with reference to the drawings. In the drawings, the same or corresponding part is denoted by the same reference numeral, and the description thereof will not generally be repeated.

First Embodiment

Application Example

FIG. 1 is a block diagram illustrating a functional configuration of a control device 100 of a wire straightener 200 according to a first embodiment. As illustrated in FIG. 1, control device 100 includes a feedback control means 110, a feedforward compensation means 120, a learning means 130, a storage means 140, a subtractor 150, and an adder 160.

Control device 100 outputs a sum of a feedback operation amount rb to straightener 200 and a feedforward compensation value rf to straightener 200 as an operation amount r such that a straightening curvature q of the wire straightened by straightener 200 approaches a target curvature qr (for example, zero). Control device 100 may output a plurality of operation amounts r to straightener 200.

Storage means 140 stores a prediction model Mp and teaching data Ds. Control device 100 and straightener 200 may be connected through a network (for example, the Internet or a cloud system), and may be disposed remotely from each other. Examples of a machine learning algorithm constructing prediction model Mp include a deep binary tree and a support vector machine.

Hereinafter, a configuration including feedback control means 110 and subtractor 150 is also referred to as a feedback control system, and a configuration including feedforward compensation means 120 and adder 160 is also referred to as a feedforward control system.

Subtractor 150 outputs an error eq (=qr−q) between target curvature qr and straightening curvature q to feedback control means 110. Feedback control means 110 determines feedback operation amount rb based on error eq and outputs feedback operation amount rb to adder 160. Feedforward compensation means 120 predicts feedforward compensation value rf from a measurement value set do obtained from straightener 200 using prediction model Mp, and outputs feedforward compensation value rf to adder 160. Measurement value set do includes at least one measurement value. Adder 160 outputs the sum of feedback operation amount rb and feedforward compensation value rf to straightener 200 and learning means 130 as operation amount r.

Learning means 130 performs machine learning on prediction model Mp using teaching data Ds. Learning means 130 acquires at least one combination Cm1 (first combination) including target curvature qr, operation amount r corresponding to target curvature qr, measurement value set do, and straightening curvature q corresponding to both measurement value set do and operation amount r. Among at least one combination Cm1, learning means 130 adds at least one combination Cm2 (second combination) including measurement value set do and operation amount r in the case where the absolute value of error eq is smaller than a reference value α (first reference value) (in the case where high-accuracy control is performed on straightener 200) to teaching data Ds as correct answer data of the machine learning. For example, reference value α can be appropriately determined based on an actual machine experiment, simulation, a standard value of a product, or a control value of a manufacturing process.

In teaching data Ds, learning means 130 calculates an average value rb0 of operation amount r in the case where the absolute value of each of at least one measurement value included in measurement value set do is smaller than a reference value β (second reference value) corresponding to the measurement value (in the case where the control system is in a steady state). For example, reference value β can be appropriately determined based on the actual machine experiment, the simulation, the standard value of the product, or the control value of the manufacturing process. Learning means 130 approximates the relationship between measurement value set do and feedforward compensation value rf that is a difference (=r−rb0) between operation amount r and average value rb0 as a function (regression curve) in which measurement value set do is set to an explanatory variable while feedforward compensation value if is set to an objective variable. Prediction model Mp includes the function. Learning means 130 ends the machine learning for prediction model Mp in the case where a ratio Cr of the number of combinations Cm4 (fourth combination) in which the absolute value of the measurement value is larger than reference value β in at least one combination Cm2 to the number of combinations Cm3 (third combination) in which the absolute value of any of the measurement values included in measurement value set do in at least one combination Cm1 is larger than reference value β is larger than a reference value δ (third reference value).

In the case where the machine learning (first learning or additional learning) for prediction model Mp ends while ratio Cr is less than or equal to reference value δ, learning means 130 resumes the machine learning (additional learning) for prediction model Mp on the assumption that the characteristic of straightener 200 changes. For example, reference value δ can be appropriately determined based on an actual machine experiment, simulation, a standard value of a product, and a management value of a certain manufacturing process. For example, a characteristic of straightener 200 includes a correspondence relationship between measurement value set do and operation amount r, and straightening curvature q.

According to control device 100, teaching data Ds is selected from the result of the feedforward control, so that prediction model Mp can be adapted to the characteristics of measurement value set do and straightener 200 in real time in parallel with the feedforward control. As a result, the burden on the user required for adjusting straightener 200 can be reduced, and the accuracy of the feedforward control on straightener 200 can be improved to reduce the deviation and variation in the straightening curvature. In addition, the prediction model is optimized based on various factors that affect straightening curvature q, so that the accuracy of the feedforward control on the straightener can be further improved. In addition, the machine learning is continued until the accuracy of prediction model Mp becomes sufficiently high, so that the accuracy of the feedforward control on straightener 200 can be sufficiently improved. Furthermore, prediction model Mp is readapted to the characteristic according to the change in the characteristic of straightener 200, so that a decrease in the accuracy of the feedforward control due to the change in the characteristic of straightener 200 can be prevented.

Figure 2:
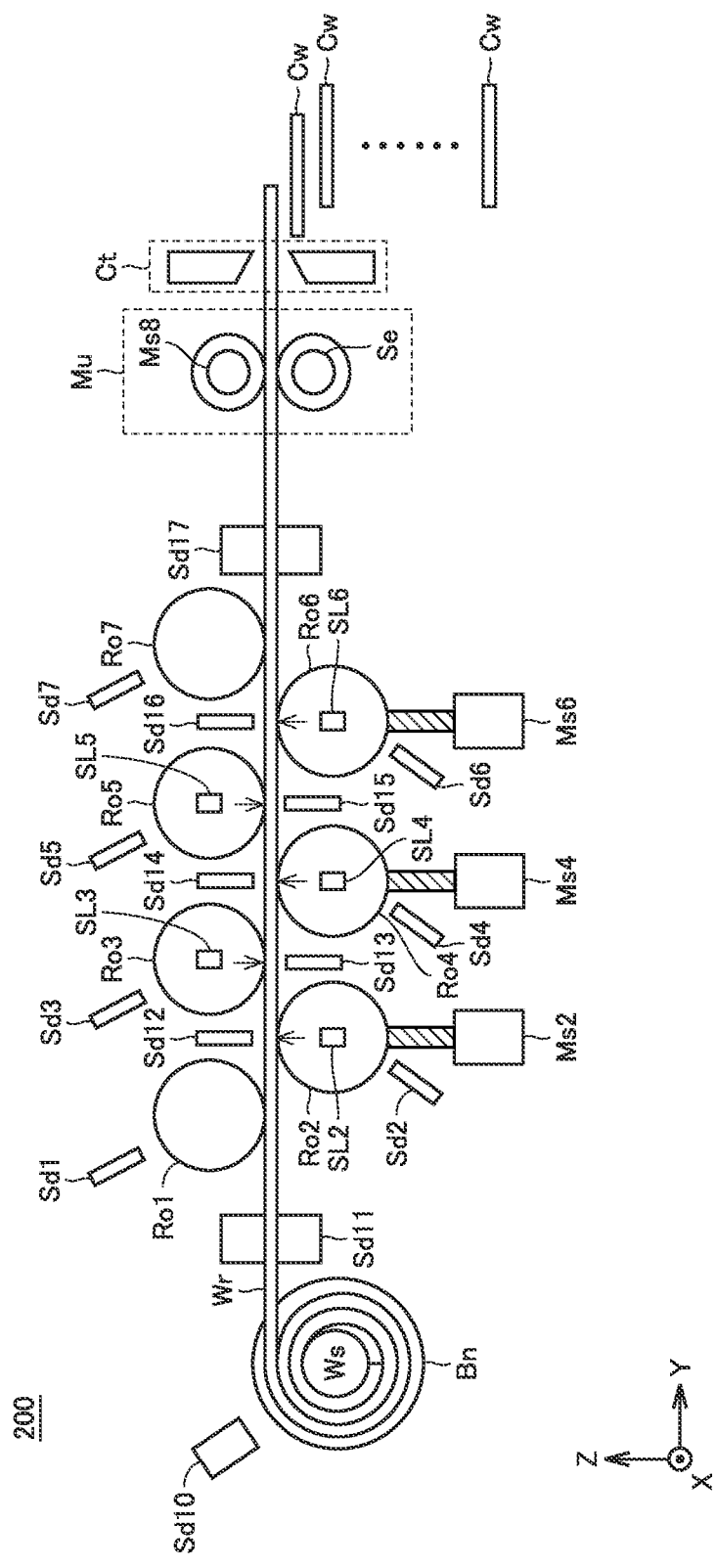
FIG. 2 is a view illustrating a specific configuration of the straightener in FIG. 1.

FIG. 2 is a view illustrating a specific configuration of straightener 200 in FIG. 1. In FIG. 2, an X-axis, a Y-axis, and a Z-axis are orthogonal to each other. The same applies to FIG. 3 described later. As illustrated in FIG. 2, straightener 200 includes a bobbin Bn (wire supply unit), a plurality of rollers Ro1 to Ro7, a cutting portion Ct, a wire moving unit Mu, sensors Sd1, Sd2, Sd3, Sd4, Sd5, Sd6, Sd7, sensors Sd10, Sd11, Sd12, Sd13, Sd14, Sd15, Sd16, Sd17, sensors SL2, SL3, SL4, SL5, SL6, and servomotors Ms2, Ms4, Ms6.

In bobbin Bn, a wire Wr is wound around a winding axis Ws extending in an X-axis direction. Cutting portion Ct cuts wire Wr at regular intervals to generate a plurality of cut wire Cw.

The plurality of rollers Ro1 to Ro7 are alternately disposed in a Y-axis direction so as to sandwich wire Wr pulled out from bobbin Bn in a Z-axis direction, and press wire Wr in the Z-axis direction. Servomotors Ms2, Ms4, Ms6 change the positions in the Z-axis direction of rollers Ro2, Ro4, Ro6 according to operation amount r from control device 100. Each of rollers Ro2, Ro4, Ro6 presses wire Wr in a positive direction of the Z-axis direction. Each of rollers Ro3, Ro5 presses wire Wr in a negative direction of the Z-axis direction.

Wire moving section Mu pulls out wire Wr from bobbin Bn and moves wire Wr along the Y-axis direction to cutting section Ct through the plurality of rollers Ro1 to Ro7. Wire moving unit Mu includes a servomotor Ms8 and an encoder Se. Servomotor Ms8 changes the moving speed in the Y-axis direction of wire Wr by changing the rotational speed according to operation amount r from control device 100. The measurement value related to wire Wr measured by encoder Se is included in measurement value set do. The measurement value is used by control device 100 in order to acquire the moving speed in the Y-axis direction of wire Wr.

The plurality of measurement values for the plurality of rollers Ro1 to Ro7 measured by sensors Sd1 to Sd7 are included in measurement value set do. The plurality of measurement values are used by control device 100 in order to acquire a plurality of positions of the plurality of rollers Ro1 to Ro7 or a roller pitch (an interval between adjacent rollers in the Y-axis direction) of the plurality of rollers Ro1 to Ro7. For example, each of sensors Sd1 to Sd7 includes a displacement sensor or a temperature sensor.

The measurement value related to wire Wr measured by sensor Sd10 is included in measurement value set do. The measurement value is used by control device 100 in order to acquire the winding position (the position of wire Wr on an outermost side in a radial direction of winding axis Ws) of bobbin Bn. For example, sensor Sd10 includes a displacement sensor.

The measurement value related to wire Wr measured by sensor Sd11 is included in measurement value set do. The measurement value is used by control device 100 in order to acquire the position, a dimension, and an initial curvature of a part (second part) of wire Wr before being pressed by the plurality of rollers Ro1 to Ro7. For example, sensor Sd11 includes a length measuring sensor or a displacement sensor.

The plurality of measurement values related to the plurality of rollers Ro2 to Ro6 measured by sensors Sd12 to Sd16 are included in measurement value set do. The plurality of measurement values are used by control device 100 in order to acquire the positions of the rollers Ro2 to Ro6. For example, each of sensors Sd12 to Sd16 includes a displacement sensor.

The plurality of measurement values measured by sensors SL2 to SL6 are included in measurement value set do. The plurality of measurement values are used by control device 100 in order to acquire a plurality of pressures applied to wire Wr by rollers Ro2 to Ro6. For example, each of sensors SL2 to SL6 includes a load sensor.

The measurement value related to wire Wr measured by sensor Sd17 is used by control device 100 in order to acquire straightening curvature q of a part (first part) of wire Wr after being pressed by the plurality of rollers Ro1 to Ro7 and before being cut by cutting portion Ct. For example, sensor Sd17 includes a displacement sensor.

Figure 3:
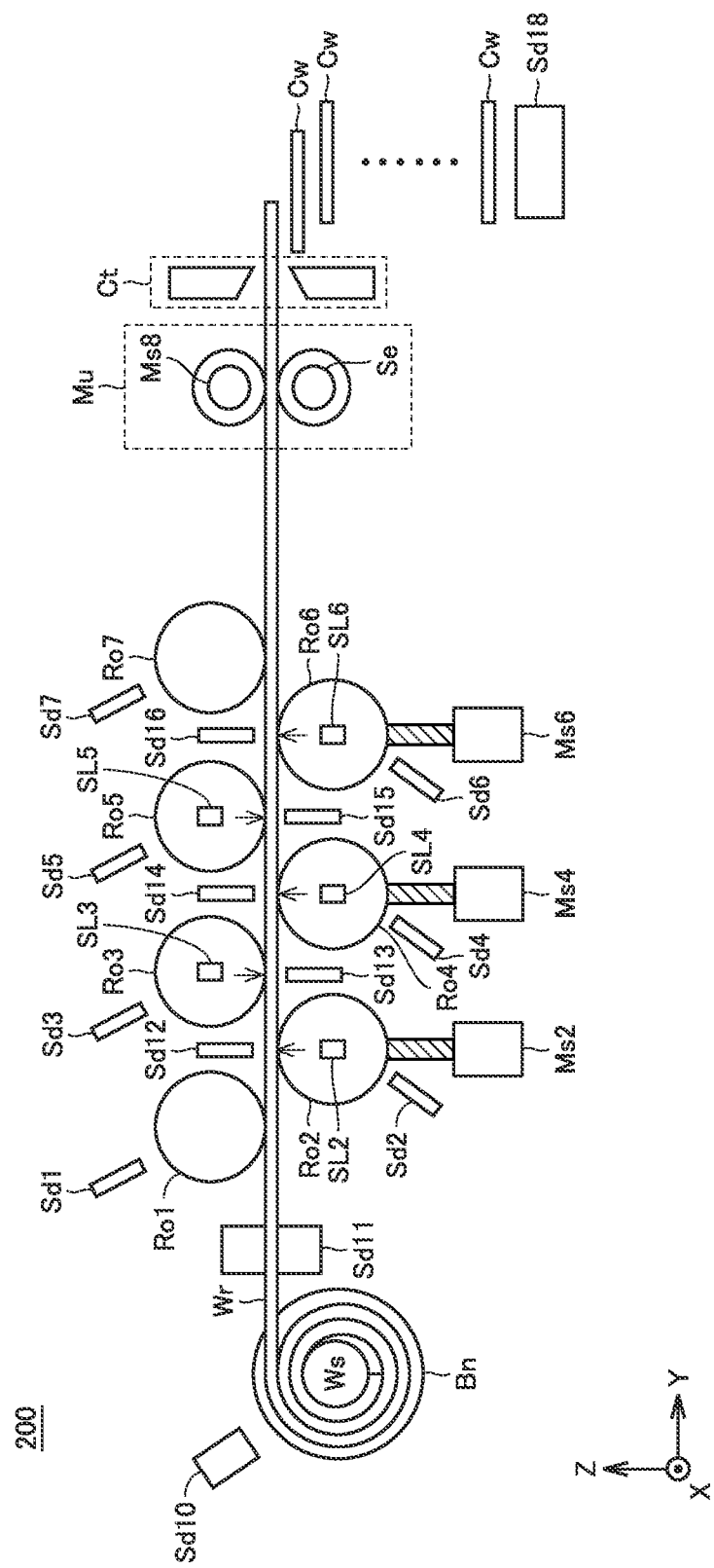
FIG. 3 is a view illustrating another example of the specific configuration of the straightener in FIG. 1.

Straightening curvature q may be calculated from the measurement value of cut wire Cw. FIG. 3 is a view illustrating another example of the specific configuration of straightener 200 in FIG. 1. The configuration of straightener 200 in FIG. 3 is a configuration in which a sensor Sd18 is added instead of sensor Sd17 in FIG. 2. Because other configurations are similar to those in FIG. 2, the description of the similar configurations will not be repeated.

As illustrated in FIG. 3, the measurement value related to cut wire Cw measured by sensor Sd18 is used by control device 100 in order to acquire straightening curvature q.

Figure 4:
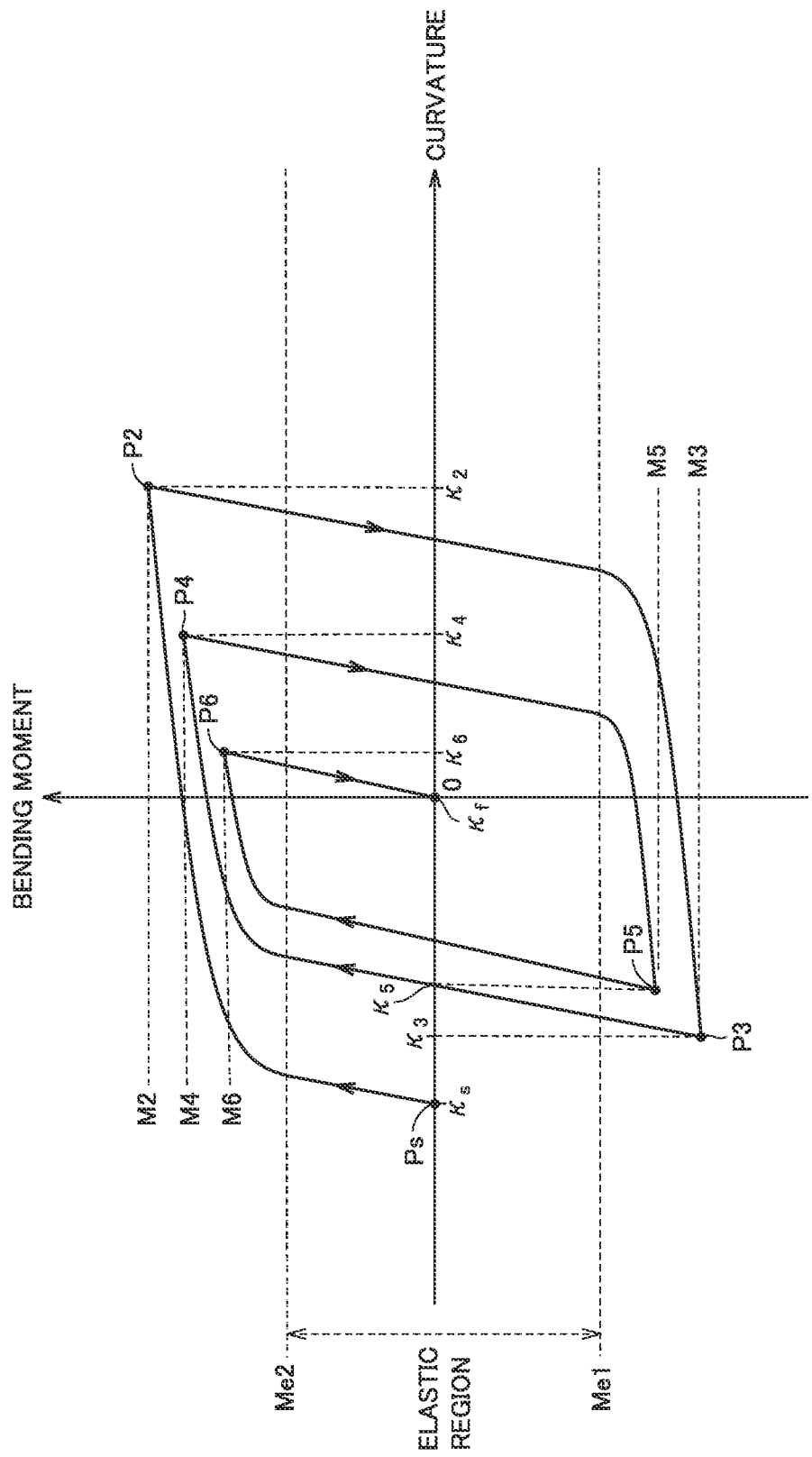
FIG. 4 is a view illustrating a straightening process of a wire by a plurality of rollers in FIGS. 2 and 3.

FIG. 4 is a view illustrating a straightening process of wire Wr by the plurality of rollers Ro1 to Ro7 in FIGS. 2 and 3. In FIG. 4, a vertical axis represents a bending moment applied to wire Wr by each of the plurality of rollers Ro1 to Ro7, and a horizontal axis represents a curvature of wire Wr. The region of bending moments Me1 and Me2 represents an elastic region in which wire Wr is elastically deformed. Bending moment Me2 is positive, and bending moment Me1 is negative. The absolute value of bending moment Me1 is equal to the absolute value of bending moment Me2. When the absolute value of the bending moment exceeds the elastic region, plastic deformation due to a yield stress is generated in wire Wr. The elastic region changes according to the yield stress of wire Wr.

A concept of the straightening will be described with reference to FIGS. 2 and 4. Strictly, the curvature and the bending moment of wire Wr are determined by the front and rear rollers, but the description will be simplified here. The curvature and the bending moment at a point Ps are $\kappa_s$ (<0) and zero, respectively. Curvature $\kappa_s$ is an initial curvature. The process from point Ps to a point P2 is the straightening process by roller Ro2. In this process, roller Ro2 presses wire Wr in the positive direction of the Z-axis direction. The curvature and the bending moment at point P2 are $\kappa_2$ (>0) and M2 (>Me2), respectively.

The process from point P2 to a point P3 is the straightening process by roller Ro3. In this process, roller Ro3 presses wire Wr in the negative direction of the Z-axis direction. The curvature and the bending moment at point P3 are $\kappa_3$ (<0) and M3 (<Me1), respectively.

The process from point P3 to a point P4 is the straightening process by roller Ro4. In this process, roller Ro4 presses wire Wr in the positive direction of the Z-axis direction. The curvature and the bending moment at point P4 are $\kappa_4$ (>0) and M4 (>Me2), respectively. Curvature $\kappa_4$ is smaller than curvature $\kappa_2$. Bending moment M4 is smaller than bending moment M2.

The process from point P4 to a point P5 is the straightening process by roller Ro5. In this process, roller Ro5 presses wire Wr in the negative direction of the Z-axis direction. The curvature and the bending moment at point P5 are $\kappa_5$ (<0) and M5 (<Me1), respectively. Curvature $\kappa_5$ is larger than curvature $\kappa_3$. Bending moment M5 is larger than bending moment M3.

The process from point P5 to a point P6 is the straightening process by roller Ro6. In this process, roller Ro6 presses wire Wr in the positive direction of the Z-axis direction. The curvature and the bending moment at point P6 are $\kappa_6$ (>0) and M6 (>Me2), respectively. Curvature $\kappa_6$ is smaller than curvature $\kappa_4$. Bending moment M6 is smaller than bending moment M4.

After the pressing of wire Wr by the plurality of rollers Ro1 to Ro7 is completed, the curvature of wire Wr changes from curvature $\kappa_6$ to a straightening curvature $\kappa_f$ (<$\kappa_6$) as the bending moment of wire Wr decreases.

Figure 5:
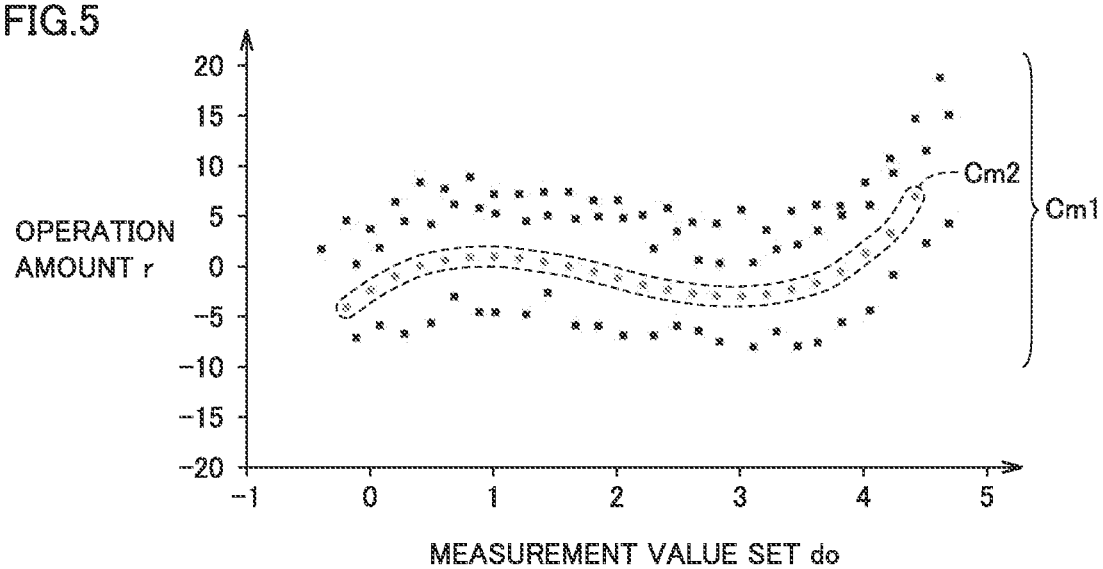
FIG. 5 is a distribution diagram illustrating a measurement value set and an operation amount.

FIG. 5 is a distribution diagram illustrating measurement value set do and operation amount r. In FIG. 5, in order to make the description regarding teaching data Ds and prediction model Mp easy to understand, the distribution diagram in the simplest case where measurement value set do includes one measurement value (the dimension of measurement value set do is 1) is illustrated. The same applies to FIGS. 6, 7, 9, 10 described later.

In FIG. 5, a square point represents combination Cm1 in the case where the absolute value of error eq is greater than or equal to reference value α among the plurality of combinations Cm1, and a circle point represents combination Cm2 in the case where the absolute value of error eq is smaller than reference value α. Learning means 130 adds a plurality of combinations Cm2 represented by circle dots to teaching data Ds.

Figure 6:
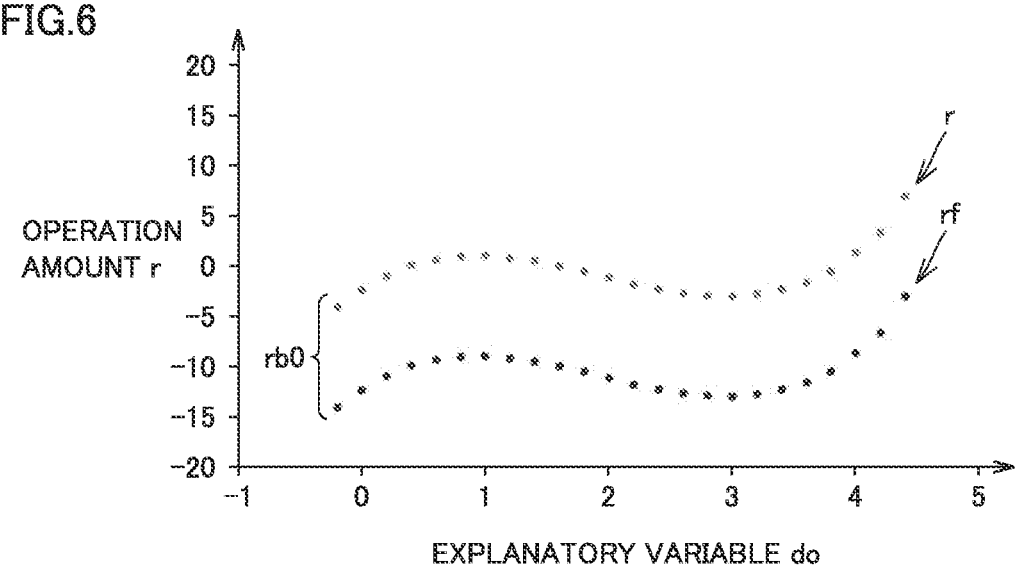
FIG. 6 is a view illustrating a relationship between an operation amount in FIG. 5 and an objective variable of a prediction model.

FIG. 6 is a view illustrating a relationship between operation amount r in FIG. 5 and objective variable rf of prediction model Mp. As illustrated in FIG. 6, data obtained by subtracting average value rb0 from operation value r of each of the plurality of combinations Cm2 corresponds to objective variable rf.

Figure 7:
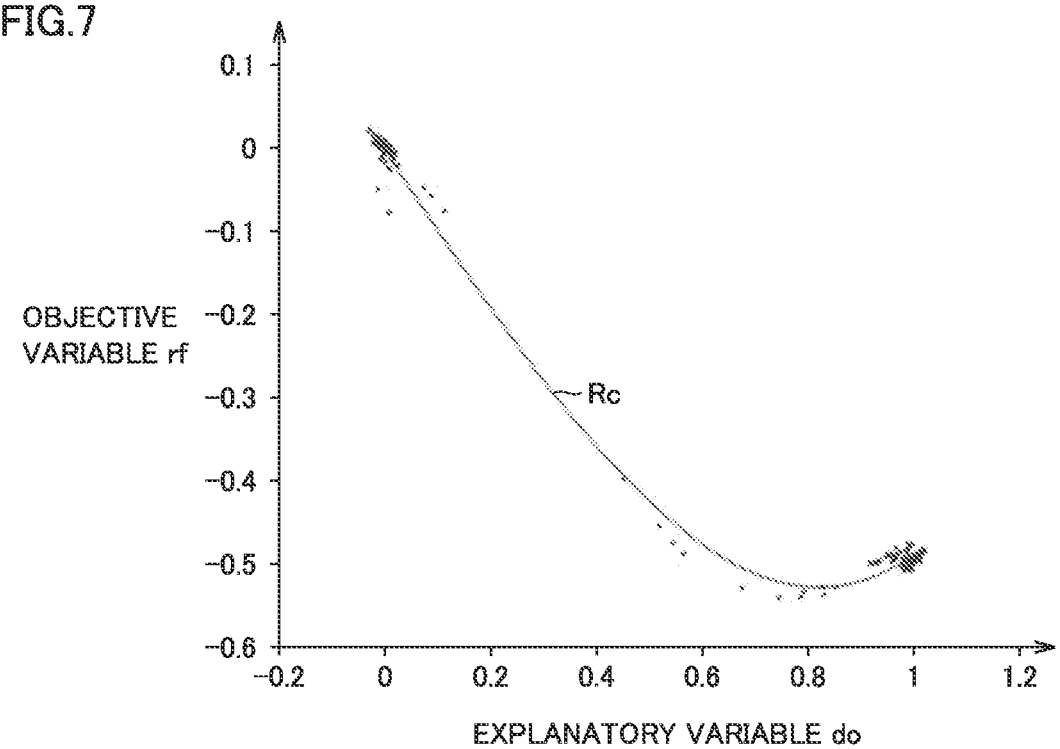
FIG. 7 is a view illustrating a relationship, between the objective variable and an explanatory variable, which is expressed by the learned prediction model.

FIG. 7 is a view illustrating a relationship between objective variable rf and an explanatory variable do expressed by learned prediction model Mp. The relationship is approximated as a regression curve Rc by learning means 130. As illustrated in FIG. 7, prediction model Mp receives measurement value set do and outputs objective variable if corresponding to measurement value set do in regression curve Rc.

Figure 8:
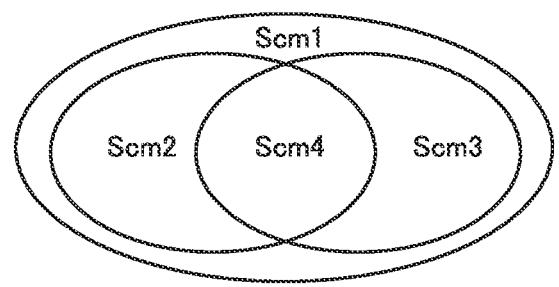
FIG. 8 is a Venn diagram illustrating an inclusion relationship of four data sets each of which includes four combinations.

FIG. 8 is a Venn diagram illustrating an inclusion relationship of four data sets Scm1, Scm2, Scm3, Scm4 each of which includes four combinations Cm1 to Cm4. Data set Scm1 is a data set including all of combination Cm1 including target curvature qr, operation amount r, measurement value set do, and straightening curvature q. Data set Scm2 is a data set including all combinations Cm2 including measurement value set do and operation amount r when the absolute value of error eq is smaller than reference value α in data set Scm1. Data set Scm3 is a data set including all combinations Cm3 when the absolute value of each measurement value of measurement value set do is larger than reference value β corresponding to the measurement value in data set Scm1. Data set Scm4 is a data set including all combinations Cm4 in which the absolute value of each measurement value of measurement value set do is larger than reference value β corresponding to the measurement value in data set Scm2. As illustrated in FIG. 8, data set Scm1 includes data sets Scm2, Scm3. Data set Scm4 is a common part (product set) between data sets Scm2 and Scm3. Average value rb0 is an average value of the data set in which data set Scm4 is removed from data set Scm2.

Figure 9:
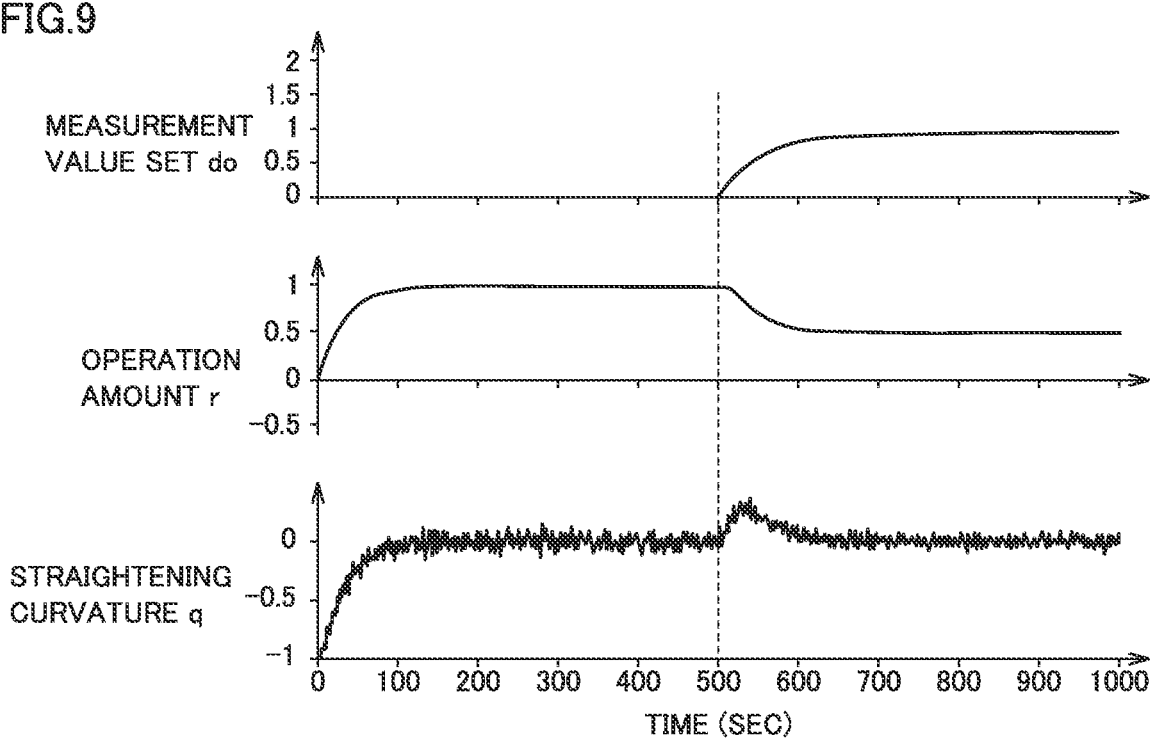
FIG. 9 is a view illustrating a time chart of each of a straightening curvature, the operation amount, and a measurement value set when the prediction model is unlearned.

FIG. 9 is a view illustrating a time chart of each of measurement value set do, operation amount r, and straightening curvature q when prediction model Mp is unlearned. Measurement value set do that changes similarly to the step response of the first-order lag system at the time of 500 seconds is input as illustrated in FIG. 9. A pulse-like noise is superimposed on straightening curvature q at the time interval of 500 seconds to 600 seconds according to measurement value set do.

Figure 10:
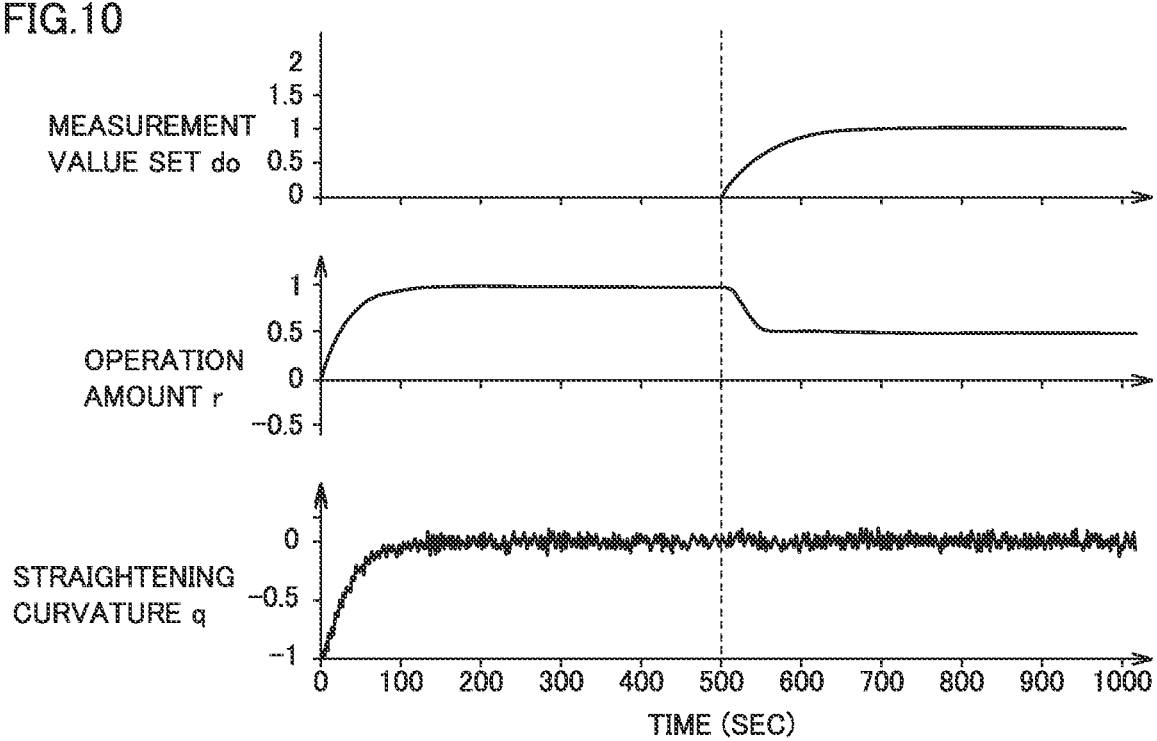
FIG. 10 is a view illustrating a time chart of each of the straightening curvature, the operation amount, and the measurement value set when the prediction model is learned.

FIG. 10 is a view illustrating a time chart of each of measurement value set do, operation amount r, and straightening curvature q when the prediction model Mp is learned. Also in FIG. 10, similarly to FIG. 9, measurement value set do that changes similarly to the step response of the first-order lag system is input at the time of 500 seconds. However, almost no pulsed noise as illustrated in FIG. 9 is generated in straightening curvature q. In FIG. 10, operation amount r is corrected by feedforward compensation value rf predicted by learned prediction model Mp, so that the fluctuation of straightening curvature q is prevented.

Figure 11:
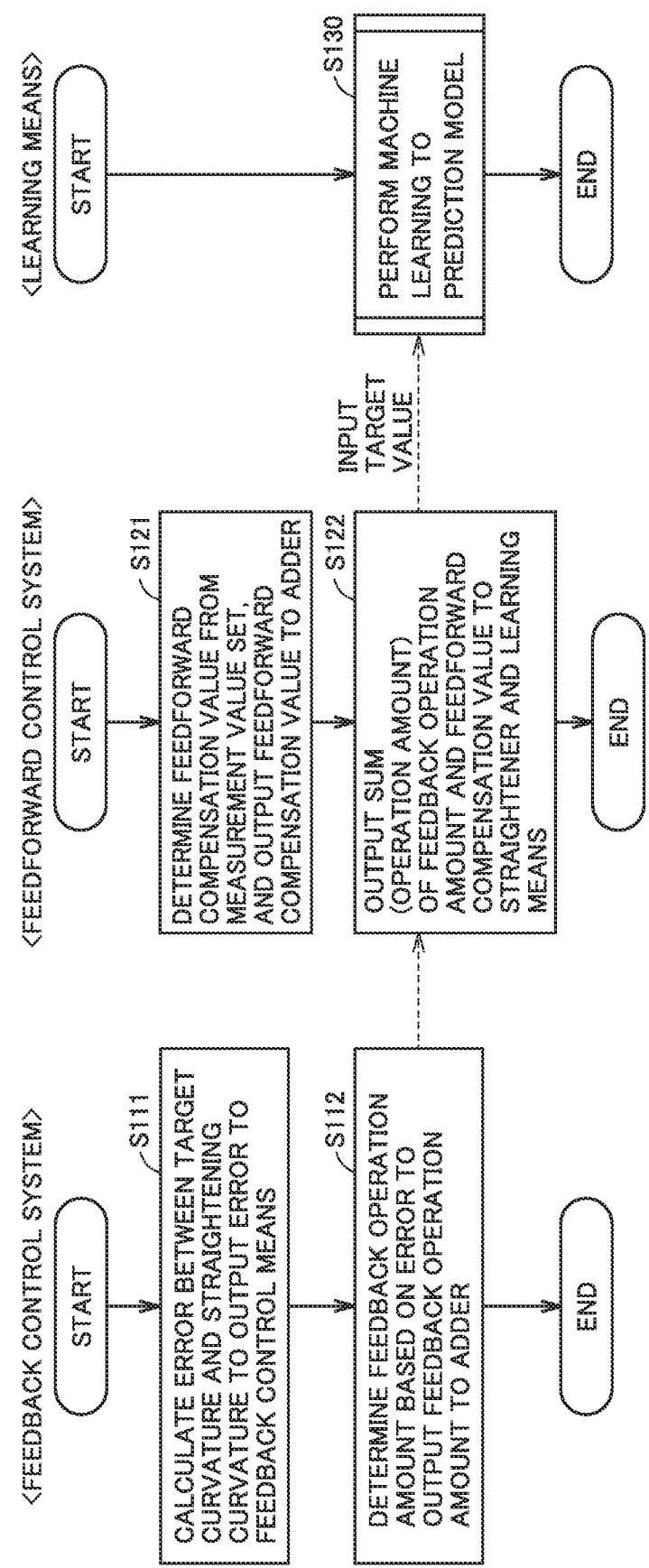
FIG. 11 is a flowchart illustrating a processing flow performed by each of a feedback control system, a feedforward control system, and learning means in FIG. 1.

FIG. 11 is a flowchart illustrating a processing flow performed by each of the feedback control system, the feedforward control system, and learning means 130 in FIG. 1. For example, a routine corresponding to each of the flowcharts of the feedback control system and the feedforward control system is executed at each sampling time. For example, the routine corresponding to the flowchart of learning means 130 is executed in response to the initial execution of the routine corresponding to each flowchart of the feedforward control system. Hereinafter, the step is simply referred to as S.

As illustrated in FIG. 11, in S111, subtractor 150 calculates error eq between target curvature qr and straightening curvature q, and outputs error eq to feedback control means 110. In S112, feedback control means 110 determines feedback operation amount rb based on error eq, outputs feedback operation amount rb to adder 160, and ends the processing.

In S121, feedforward compensation means 120 determines feedforward compensation value rf from measurement value set do, and outputs feedforward compensation value rf to adder 160. In S122, adder 160 outputs the sum of feedback operation amount rb and feedforward compensation value rf to straightener 200 and learning means 130 as operation amount r, and ends the processing.

In S130, learning means 130 performs the machine learning using teaching data Ds for prediction model Mp, and ends the processing. When the plurality of operation amounts r are output from control device 100 to straightener 200, the processing in FIG. 11 is performed for each of the plurality of operation amounts r.

Figure 12:
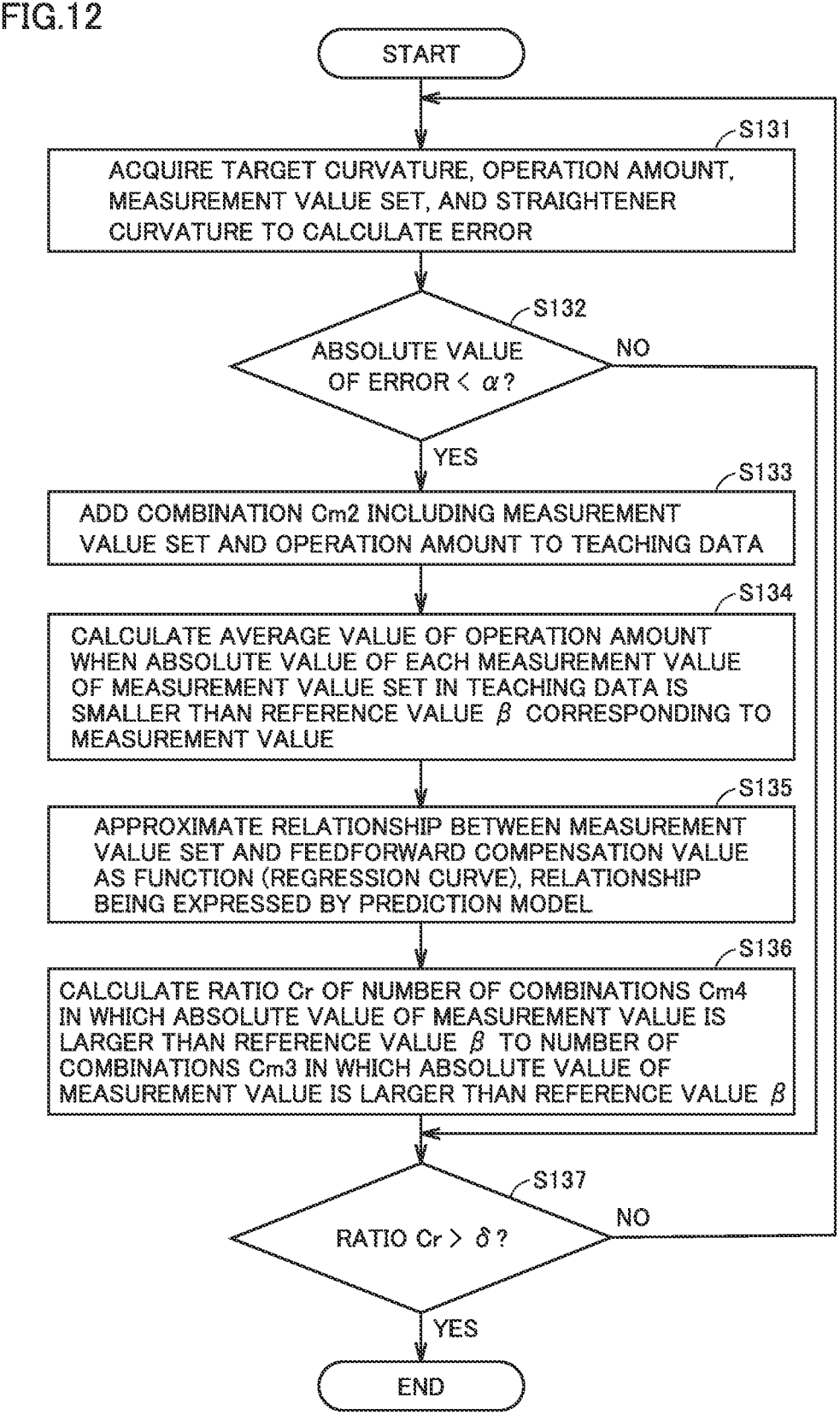
FIG. 12 is a flowchart illustrating a specific processing flow of machine learning processing in FIG. 11.

FIG. 12 is a flowchart illustrating a specific processing flow of machine learning processing S130 in FIG. 11. In S131, learning means 130 acquires target curvature qr, operation quantity r, measurement value set do, and straightening curvature q, calculates error eq, and advances the processing to S132. In S132, learning means 130 determines whether the absolute value of error eq is smaller than reference value α. When the absolute value of error eq is greater than or equal to reference value α (NO in S132), learning means 130 advances the processing to S137.

When the absolute value of error eq is smaller than reference value α a (YES in S132), learning means 130 adds combination Cm2 including measurement value set do and operation amount r to teaching data Ds in S133, and advances the processing to S134. In S134, learning means 130 calculates average value rb0 of operation amount r when the absolute value of each measurement value of measurement value set do in teaching data Ds is smaller than reference value β corresponding to the measurement value, and advances the processing to S135. In S135, learning means 130 approximates the relationship, between measurement value set do and feedforward compensation value if that is the difference between manipulation value r and average value rb0, which is expressed by prediction model Mp, as the function (regression curve) in which measurement value set do is set to the explanatory variable while feedforward compensation value rf is set to the objective variable, and advances the processing to S136.

In S136, learning means 130 calculates ratio Cr (=N2/N1) of a number N2 of combinations Cm4 in which the absolute value of measurement value set do is larger than reference value β in at least one combination Cm2 to a number N1 of combinations Cm3 in which the absolute value of measurement value set do is larger than reference value β in at least one combination Cm1, and advances the processing to S137. In S137, learning means 130 determines whether ratio Cr is larger than reference value δ. When ratio Cr is less than or equal to reference value δ (NO in S137), learning means 130 determines that the accuracy of the feedforward control to straightener 200 is insufficient, and returns the processing to S131. When ratio Cr is larger than reference value δ (YES in S137), learning means 130 ends the machine learning assuming that the accuracy of the feedforward control to straightener 200 is sufficiently enhanced.

Figure 13:
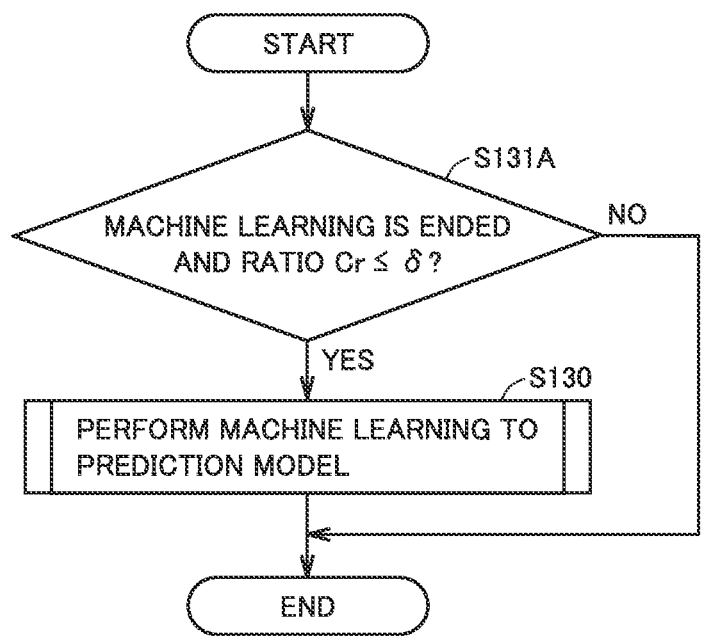
FIG. 13 is a view illustrating an additional learning processing flow performed by the learning means in FIG. 1.

FIG. 13 is a view illustrating an additional learning processing flow performed by learning means 130 in FIG. 1. The processing in FIG. 13 is executed at each sampling time, for example, after the initial machine learning is started. In S131A, learning means 130 determines whether the machine learning is finished and whether ratio Cr is less than or equal to reference value δ. When the machine learning is not completed or ratio Cr is larger than reference value δ (NO in S131A), it is determined that the characteristic of straightener 200 does not change while existing learned prediction model Mp conforms to straightener 200, and learning means 130 ends the processing.

When the machine learning is ended while ratio Cr is less than or equal to reference value δ (YES in S131A), learning means 130 assumes that the characteristic of straightener 200 is changed after the end of the previous machine learning, and resumes the machine learning for prediction model Mp in S130 similar to FIG. 11 in order to adapt prediction model Mp to the characteristic of straightener 200 again. According to control device 100, the additional learning for prediction model Mp is performed according to the change in the characteristic of straightener 200, so that the decrease in the accuracy of the feedforward control due to the change in the characteristic of straightener 200 can be prevented.

First Modification of First Embodiment

In the first embodiment, the case where the relationship between measurement value set do and feedforward compensation value rf that is the difference between operation amount r and average value rb0 is expressed by the prediction model has been described. In a first modification of the first embodiment, the case where the relationship expressed by the prediction model is the relationship between measurement value set do and operation value r will be described.

Figure 14:
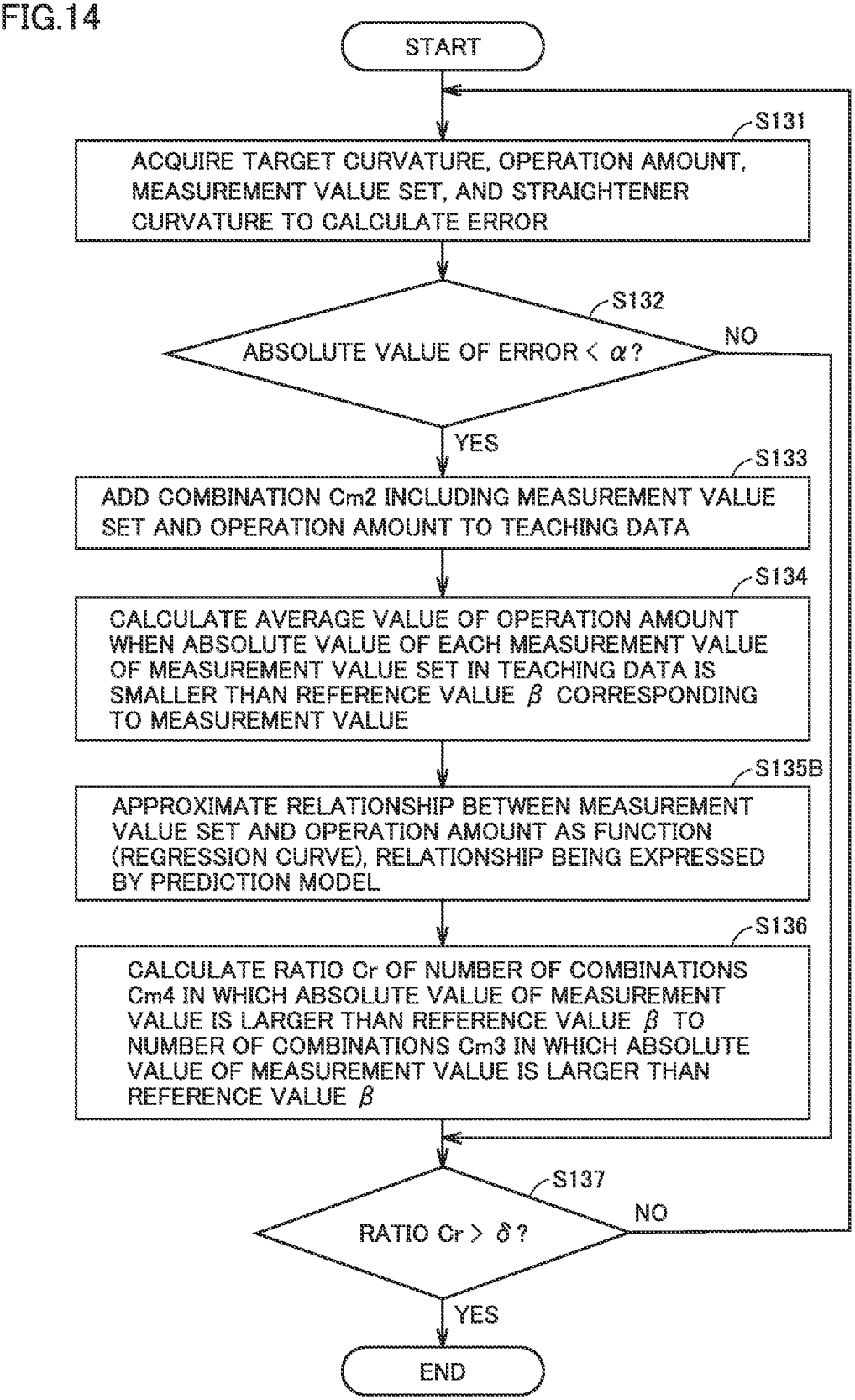
FIG. 14 is a flowchart illustrating another example of the specific processing flow of the machine learning processing in FIG. 11.

FIG. 14 is a flowchart illustrating another example of the specific processing flow of machine learning processing S130 in FIG. 11. The flowchart in FIG. 14 is a flowchart in which S135 in FIG. 12 is replaced with S135B. As illustrated in FIG. 14, after performing S131 to S134 similarly to the first embodiment, in S135B, learning means 130 approximates the relationship, between measurement value set do and manipulation value r, which is expressed by prediction model Mp, as the function (regression curve) in which operation value r is set to the objective variable while measurement value set do is set to the explanatory variable, and advances the processing to S136. Learning means 130 performs S136, S137 similarly to the first embodiment, and ends the processing. Feedforward compensation means 120 predicts operation amount r from measurement value set do using prediction model Mp, and outputs a value (=r−rb0) obtained by subtracting average value rb0 from operation amount r to adder 160 as feedforward compensation value rf.

Second Modification of First Embodiment

In the first embodiment, the configuration including both the feedback control system and the feedforward control system has been described. In a second modification of the first embodiment, a configuration including no feedback control system will be described.

Figure 15:
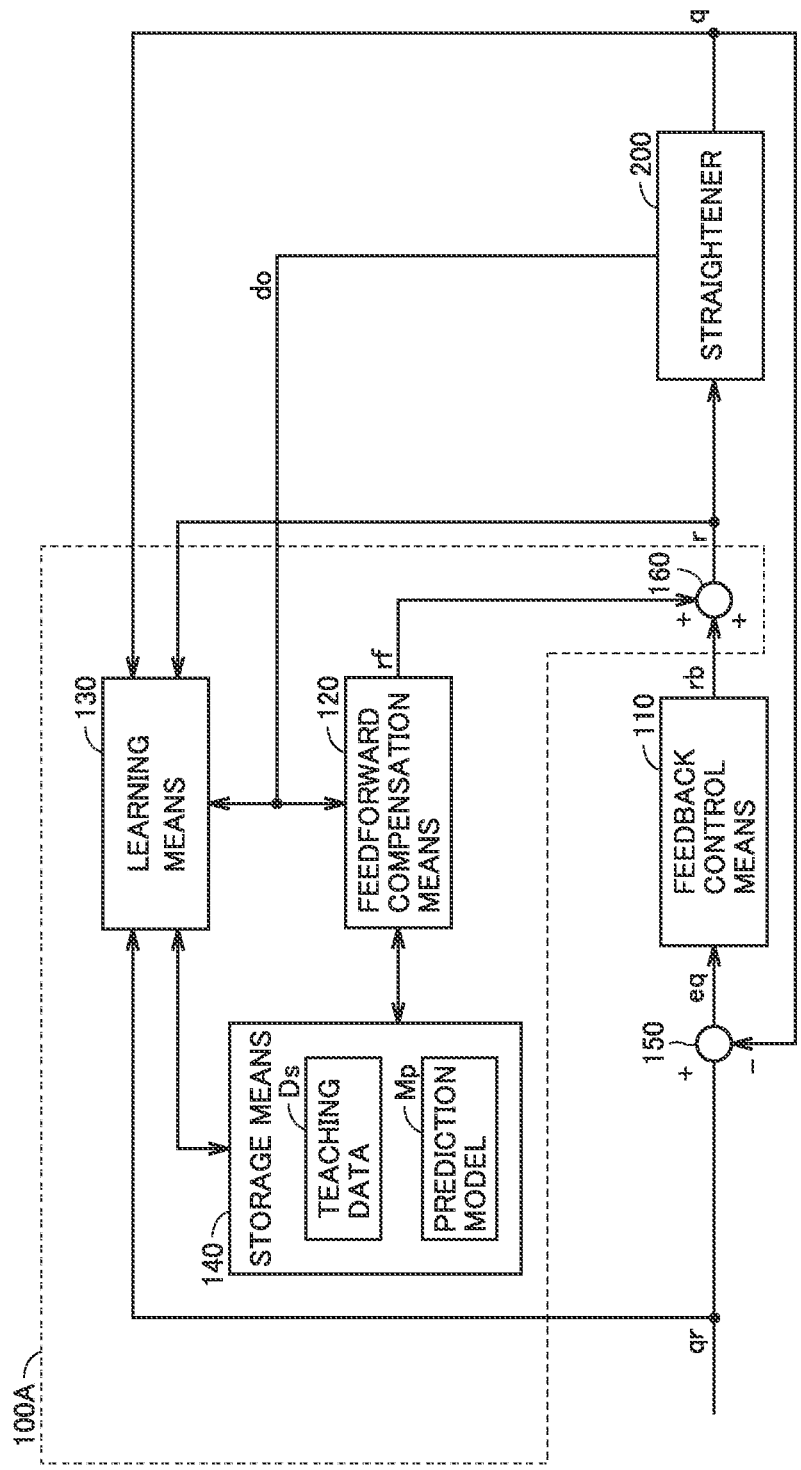
FIG. 15 is a block diagram illustrating a functional configuration of a control device of a wire straightener according to a second modification of the first embodiment.

FIG. 15 is a block diagram illustrating a functional configuration of a control device 100A of wire straightener 200 according to a second modification of the first embodiment. A configuration of a control device 100A is a configuration in which subtractor 150 and feedback control means 110 are removed from control device 100 in FIG. 1. Because the other configurations are similar, the description of the similar configuration will not be repeated. Adder 160 may not be included in control device 100A.

Control device 100A determines feedforward compensation value rf such that straightening curvature q of the wire straightened by straightener 200 approaches target curvature qr. According to control device 100A, the control device is added to the feedback control system while the existing feedback control system is left, so that the existing feedback control system can be easily extended to the control system including the feedforward control system and the learning function.

As described above, according to the control device and the control method of the first embodiment and the first and second modifications, the accuracy of the feedforward control for the wire straightener can be improved.

Second Embodiment

In the first embodiment, the case where the feedback control system, the feedforward control system, and the configuration performing the machine learning on the prediction model are included in one control device has been described. In a second embodiment, a configuration in which the feedback control system, the feedforward control system, and the configuration performing the machine learning on the prediction model are divided into separate devices will be described.

Figure 16:
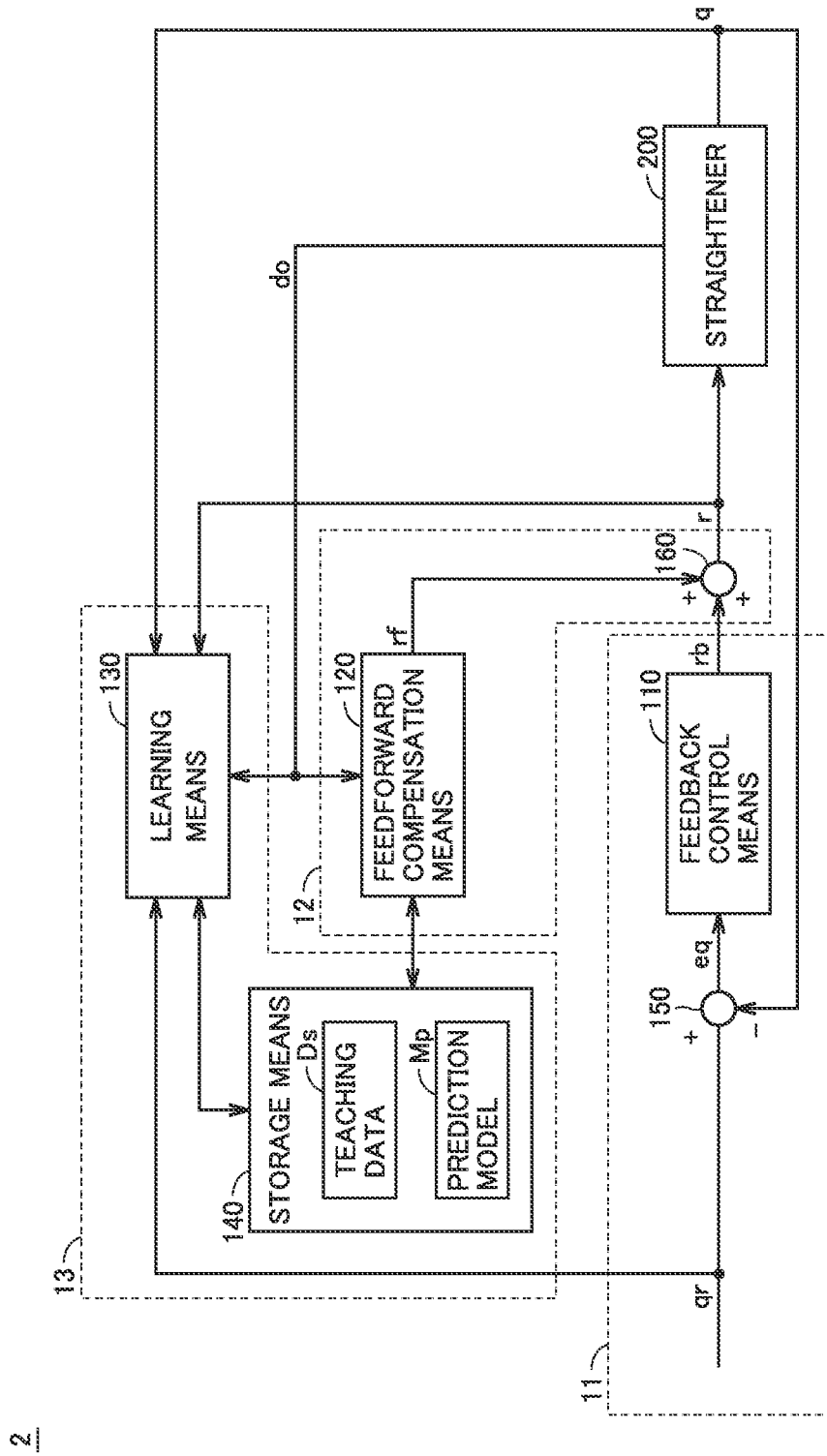
FIG. 16 is a block diagram illustrating a functional configuration of a control system according to a second embodiment.

FIG. 16 is a block diagram illustrating a functional configuration of a control system 2 of the second embodiment. In FIG. 16, because the configuration denoted by the same reference numeral as that in FIG. 1 has a function similar to that of the configuration specified by the reference numeral described in the first embodiment, the description of the similar configuration will not be repeated.

As illustrated in FIG. 16, control system 2 includes a feedback control device 11, a feedforward compensation device 12, and a learning device 13. Feedback control device 11 includes feedback control means 110 and subtractor 150. Feedforward compensation device 12 includes feedforward compensation means 120 and adder 160. Learning device 13 includes learning means 130 and storage means 140. Feedback control device 11, feedforward compensation device 12, learning device 13, and straightener 200 may be connected to each other through the network and disposed remotely from each other. Adder 160 may be included in feedback control device 11 instead of feedforward compensation device 12.

According to control system 2, the feedforward compensation device and the learning device are added to the feedback control device while the existing feedback control device is left, whereby the existing control system can easily be extended.

As described above, according to the control system and the control method of the second embodiment, the accuracy of the feedforward control for the wire straightener can be improved.

Third Embodiment

In a third embodiment, a configuration in which the control device includes a programmable logic controller (PLC) will be described as an example of the control device of the first embodiment.

<Network Configuration Example of Control System>

Figure 17:
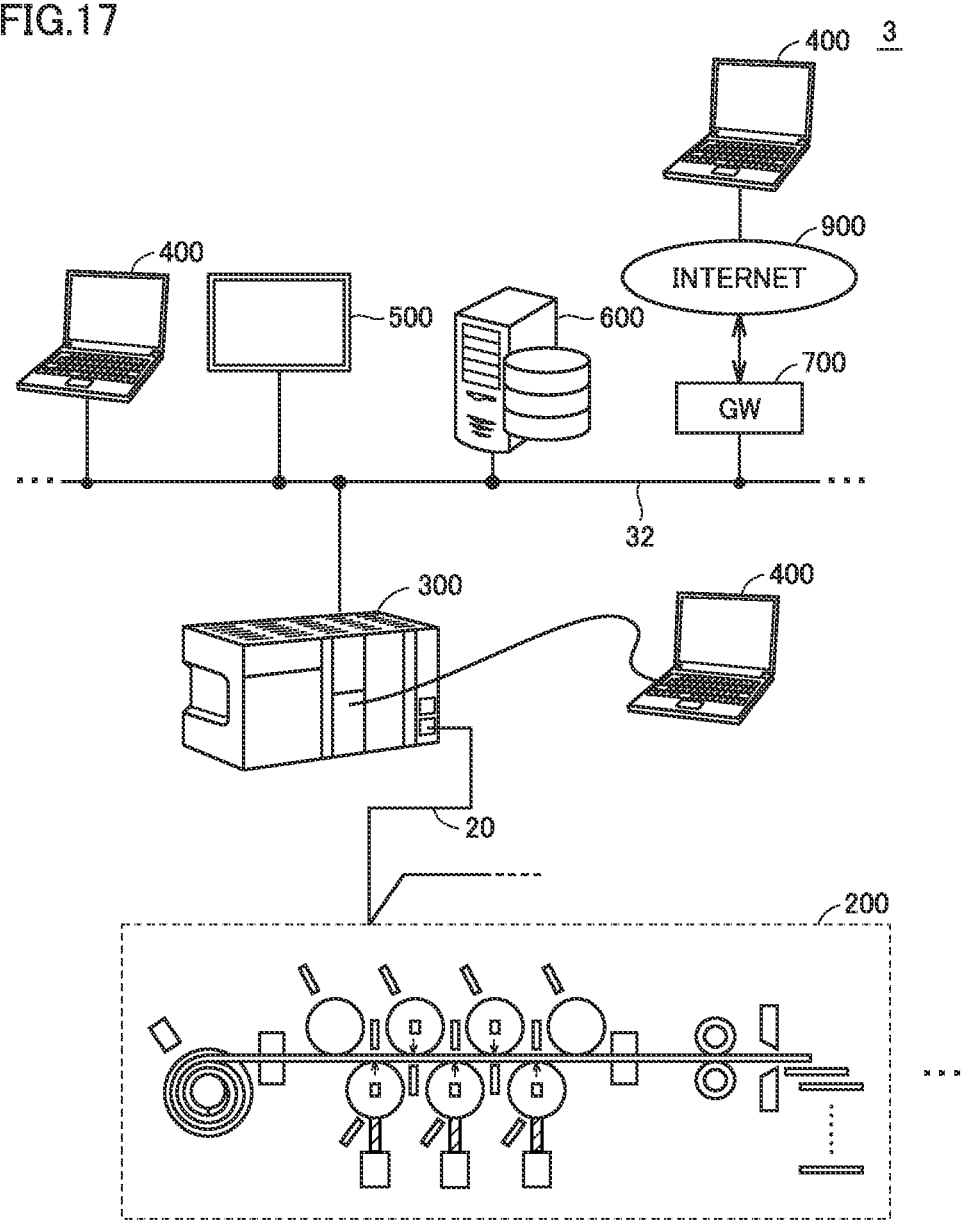
FIG. 17 is a schematic diagram illustrating a network configuration example of a control system according to a third embodiment.

FIG. 17 is a schematic diagram illustrating a network configuration example of a control system 3 of the third embodiment. As illustrated in FIG. 17, control system 3 includes a device group in which a plurality of devices are configured to be able to communicate with each other. Typically, the device may include a control device 300 that is a processing main constituent executing a control program and a peripheral device connected to control device 300. control device 300 has a functional configuration similar to that of control device 100 in FIG. 1.

Control device 300 corresponds to an industrial control device that controls various facilities and devices. Control device 300 is a type of computer that executes the control arithmetic operation, and typically includes the PLC. Control device 300 is connected to straightener 200 through field network 20. Control device 300 exchanges the data with at least one straightener 200 through field network 20.

The control arithmetic operation executed in control device 300 includes the processing for collecting the data collected or generated in straightener 200, the processing for generating the data such as a command value (operation amount) for straightener 200, and the processing for transmitting the generated output data to target straightener 200. The data collected or generated by straightener 200 includes the data related to the measurement value obtained from straightener 200 and a controlled variable as a result of the actual operation of straightener 200 according to the command values. The command value for straightener 200 is determined by adding the feedforward compensation value predicted from the measurement value by the prediction model to the operation amount provisionally calculated based on the error between the control target value (target curvature) calculated based on the control program executed by control device 300 and the actual control variable (straightening curvature).

Field network 20 preferably adopts a bus or a network that performs constant periodic communication. EtherCAT (registered trademark), EtherNet/IP (registered trademark), DeviceNet (registered trademark), CompoNet (registered trademark), and the like are known as the bus or the network that performs the constant periodic communication. EtherCAT (registered trademark) is preferred in that an arrival time of the data is guaranteed.

Another straightener 200 and any field device can be connected to field network 20. The field device includes an actuator that exerts some physical action on a robot or a conveyer on the field side and an input and output device that exchanges information with the field.

Control device 300 is also connected to another device through a higher-order network 32. Higher-order network 32 is connected to the Internet 900 that is an external network through a gateway 700. Ethernet (registered trademark) or EtherNet/IP (registered trademark), which is a general network protocol, may be adopted as higher-order network 32. More specifically, at least one server device 600 and at least one display device 500 may be connected to higher-order network 32.

A database system, a manufacturing execution system (MES), or the like is assumed as server device 600. The manufacturing execution system acquires the information from the manufacturing device or facility of the control target to monitor and manage the entire production, and can also handle order information, quality information, shipping information, and the like. The present invention is not limited thereto, and a device that provides an information system service may be connected to higher-order network 32. Processing for acquiring the information from the manufacturing device or facility of the control target to perform macro or micro analysis or the like is assumed as the information system service. For example, data mining extracting some characteristic tendency included in the information from the manufacturing device or facility of the control target, a machine learning tool performing the machine learning based on information from the facility or machine of the control target, and the like are assumed as the information system service.

Display device 500 receives an operation from the user, outputs a command or the like corresponding to the user operation to control device 300, and graphically displays the arithmetic result or the like in control device 300.

A support device 400 can be connected to control device 300. Support device 400 may be connected to control device 300 through higher-order network 32 or the Internet 900. Support device 400 is a device that supports preparation required for control device 300 to control the control target. Specifically, support device 400 provides a development environment (program preparing and editing tool, parser, compiler, and the like) of the program executed by control device 300, a setting environment for setting configuration information (configurations) of control device 300 and various devices connected to control device 300, the function for outputting the generated program to control device 300, the function for correcting and changing the program executed on control device 300 online, and the like.

In control system 3, control device 300, support device 400, and display device 500 are configured separately, but a configuration in which all or some of these functions are integrated into a single device may be adopted.

Control device 300 is used not only in one production site but also in another production site. In addition, there is also the case where a plurality of different lines are used in one production site.

<Hardware Configuration Example of Control Device>

Figure 18:
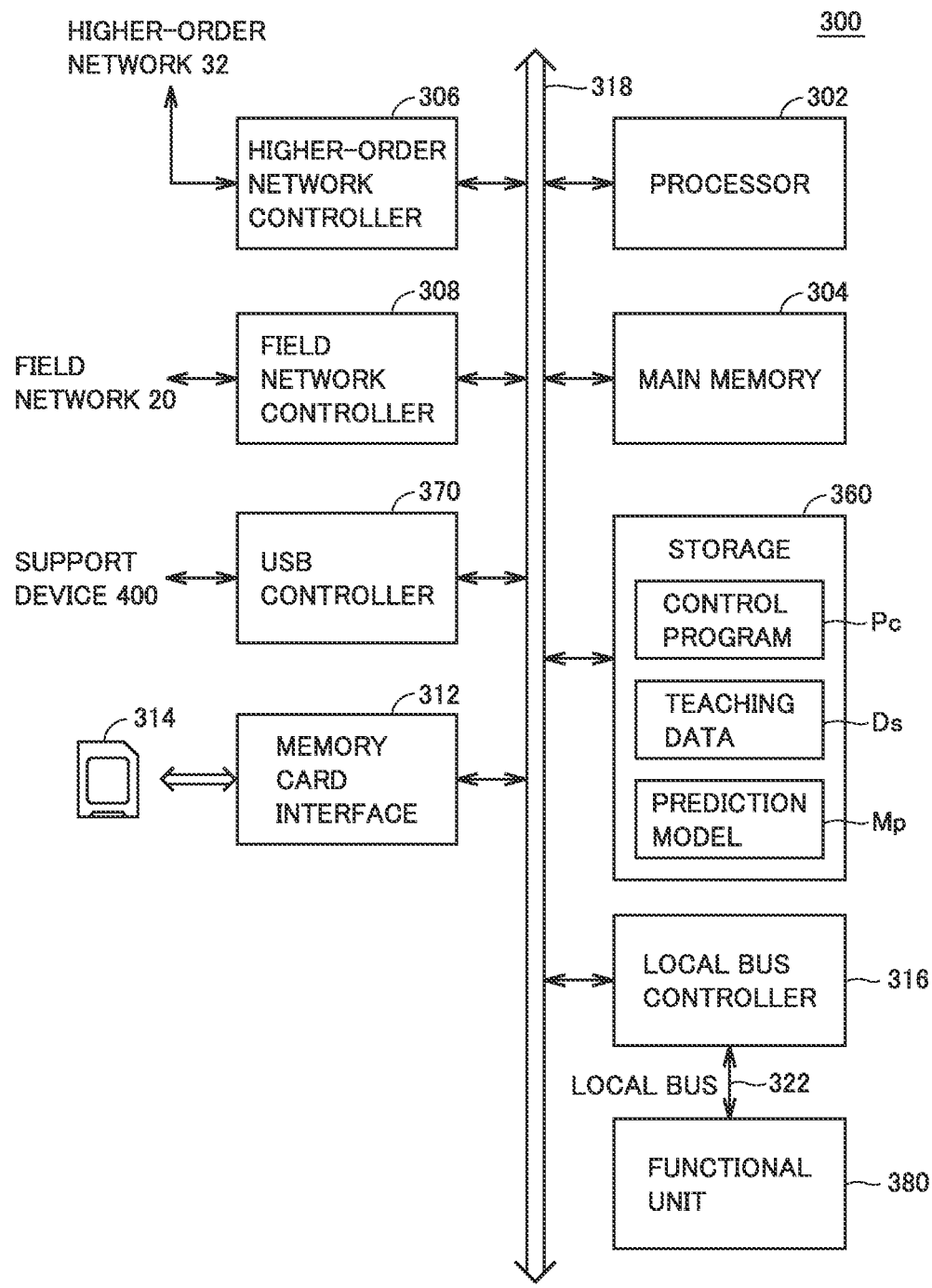
FIG. 18 is a block diagram illustrating a hardware configuration example of a control device in FIG. 17.

FIG. 18 is a block diagram illustrating a hardware configuration example of control device 300 in FIG. 17. As illustrated in FIG. 18, control device 300 includes a processor 302, a main memory 304, a storage 360, a memory card interface 312, a higher-order network control device 306, a field network control device 308, a local bus control device 316, and a universal serial bus (USB) control device 370 that provides a USB interface. These components are connected to each other through a processor bus 318.

Processor 302 corresponds to an arithmetic processing portion that executes control arithmetic operation, and is constituted of a central processing unit (CPU), and/or a graphics processing unit (GPU), and the like. Specifically, processor 302 reads various programs stored in storage 360, expands the various programs in main memory 304, and executes the various programs, thereby implementing the control arithmetic operation to straightener 200.

Main memory 304 includes a dynamic random access memory (DRAM) and/or a static random access memory (SRAM), or the like. Storage 360 is constructed of a nonvolatile storage device such as a solid state drive (SSD) and a hard disk drive (HDD).

Storage 360 stores a control program Pc, teaching data Ds, and prediction model Mp. Storage 360 corresponds to storage means 140 in FIG. 1. Control program Pc includes a program integrally controlling control device 300 to implement each function of control device 300. That is, processor 302 that executes control program Pc corresponds to the feedback control system (feedback control means 110 and subtractor 150), the feedforward control system (feedforward compensation means 120 and adder 160), and learning means 130 in FIG. 1.

Memory card interface 312 receives memory card 314 that is an example of a detachable recording medium, Memory card interface 312 can read and write arbitrary data from and in memory card 314.

Higher-order network control device 306 exchanges the data with an arbitrary information processing device connected to higher-order network 32 through higher-order network 32 (for example, the local area network).

Field network control device 308 mainly exchanges the data with straightener 200 through field network 20.

Local bus control device 316 exchanges the data with an arbitrary functional unit 380 constituting control device 300 through local bus 322. For example, functional unit 380 includes an analog I/O unit that is responsible for inputting and/or outputting an analog signal, a digital I/O unit that is responsible for inputting and/or outputting a digital signal, and a counter unit that receives a pulse from an encoder.

USB control device 370 exchanges the data with an arbitrary information processing device through the USB connection. For example, support device 400 is connected to USB control device 370.

As described above, according to the control device and the control method of the third embodiment, the accuracy of the feedforward control for the wire straightener can be improved.

APPENDIX

The above embodiments include the following technical ideas.

Configuration 1

A control device (100, 100A, 300) of a straightener (200), the control device (100, 100A, 300) determining a feedforward compensation value (rf) corresponding to a feedback operation amount (rb) to the straightener (200) such that a straightening curvature (q) of a wire (Wr) straightened by the straightener (200) approaches a target curvature (qr),
the straightener (200) including:
a wire supply unit (Bn) including the wire (Wr) that is wound;
a plurality of rollers (Ro1 to Ro7) that are alternately disposed so as to sandwich the wire (Wr) drawn out from the wire supply unit (Bn) and that are configured to press the wire (Wr); and
a wire moving unit (Mu) configured to pull out the wire (Wr) from the wire supply unit (Bn) to cause the wire (Wr) to pass through the plurality of rollers (Ro1 to Ro7),
the straightening curvature (q) being a curvature of a first part of the wire (Wr) that has passed through the plurality of rollers (Ro1 to Ro7),
the feedback operation amount (rb) being determined by a feedback control means (110) based on an error (eq) between the target curvature (qr) and the straightening curvature (q),
a sum of the feedback operation amount (rb) and the feedforward compensation value (rf) being output to the straightener (200) as an operation amount (r),
the control device (100, 100A, 300) comprising:
a feedforward compensation means (120) configured to determine the feedforward compensation value (rf) from a measurement value (do) obtained from the straightener (200), using a predictive model (Mp); and
a learning means (130) configured to perform machine learning on the prediction model (Mp) using teaching data (Ds),
wherein the learning means (130):
acquires at least one first combination (Cm1) including the target curvature (q), the operation amount (r) corresponding to the target curvature (qr), the measurement value (do), and the straightening curvature (q) corresponding to both the measurement value (do) and the operation amount (r); and adds at least one second combination (Cm2) in the at least one first combination (Cm1) to the teaching data (Ds), the at least one second combination (Cm2) including the measurement value (do) and the operation amount (r) when an absolute value of the error (eq) is smaller than a first reference value (α).

Configuration 2

The control device (100, 100A, 300) of the straightener (200) described in configuration 1, wherein
the operation amount (r) changes at least one of positions of the plurality of rollers (Ro2 to Ro6) and a moving speed of the wire (Wr), and
the control device (100, 100A, 300) acquires, from the measurement value (do), at least one of:
the moving speed of the wire (Wr);
a position of the first part;
before being pressed by the plurality of rollers (Ro1 to Ro7), a position of a second part of the wire (Wr), a dimension of the second part, and a curvature of the second part;
a winding position of the wire (Wr) in the wire supply unit (Bn); and
a position of each of the plurality of rollers (Ro2 to Ro6), a radius of each of the plurality of rollers (Ro1 to Ro7), a pitch of the plurality of rollers (Ro1 to Ro7), and pressure of the plurality of rollers (Ro2 to Ro7).

Configuration 3

The control device (100, 100A, 300) of the straightener (200) described in configuration 1 or 2, wherein
the learning means (130):
calculates an average value (rb0) of operation amounts (r) when an absolute value of the measurement value (do) is smaller than a second reference value (β) in the teaching data (Ds); and
approximates a relationship between the measurement value (do) and the feedforward compensation value (rf) that is a difference between the operation amount (r) and the average value (rb0), as a function in which the feedforward compensation value (rf) is set to an objective variable while the measurement value (do) is set to an explanatory variable, the relationship being expressed by the prediction model (Mp),
in third combinations (Cm3), the absolute value of the measurement value (do) is larger than the second reference value (β) in the at least one first combination (Cm1),
in fourth combinations (Cm4), the absolute value of the measurement value (do) is larger than the second reference value (β) in the at least one second combination (Cm2), and
the learning means (130) ends the machine learning when a ratio (Cr) of a number of the fourth combinations (Cm4) to a number of the third combinations (Cm3) is larger than a third reference value (δ).

Configuration 4

The control device (100, 100A, 300) of the straightener (200) described in configuration 1 or 2, wherein
the learning means (130):
calculates an average value (rb0) of operation amounts (r) when an absolute value of the measurement value (do) is smaller than a second reference value (β) in the teaching data (Ds); and
approximates a relationship between the measurement value (do) and the operation amount (r), as a function in which the operation amount (r) is set to an objective variable while the measurement value (do) is set to an explanatory variable, the relationship being that are expressed by the prediction model (Mp),
in third combinations (Cm3), the absolute value of the measurement value (do) is larger than the second reference value (β) in the at least one first combination (Cm1),
in fourth combinations (Cm4), the absolute value of the measurement value (do) is larger than the second reference value (β) in the at least one second combination (Cm2),
the learning means (130) ends the machine learning when a ratio (Cr) of a number of the fourth combinations (Cm4) to a number of the third combinations (Cm3) is larger than a third reference value (δ), and
the feedforward compensation means (120) determines a value obtained by subtracting the average value (rb0) from the operation amount (r) predicted from the measurement value (do) by the prediction model (Mp) as the feedforward compensation value (rf).

Configuration 5

The control device (100, 100A, 300) of the straightener (200) described in configuration 3 or 4, wherein the learning means (130) resumes the machine learning when the machine learning ends and when the ratio (Cr) is smaller than the third reference value (δ).

Configuration 6

A control system (2) that outputs a sum of a feedback operation amount (rb) to a straightener (200) and a feedforward compensation value (rf) as an operation amount (r) to the straightener (200) such that a straightening curvature (q) of a wire (Wr) straightened by the straightener (200) approaches a target curvature (qr),
the straightener (200) including:
a wire supply unit (Bn) including the wire (Wr) that is wound;
a plurality of rollers (Ro1 to Ro7) that are alternately disposed so as to sandwich the wire (Wr) drawn out from the wire supply unit (Bn) and that are configured to press the wire (Wr); and
a wire moving unit (Mu) configured to pull out the wire (Wr) from the wire supply unit (Bn) to cause the wire (Wr) to pass through the plurality of rollers (Ro1 to Ro7),
the straightening curvature (q) being a curvature of a part of the wire (Wr) that has passed through the plurality of rollers (Ro1 to Ro7),
the control system (2) comprising:
a feedback control device (11) configured to determine the feedback operation amount (rb) based on an error (eq) between the target curvature (qr) and the straightening curvature (q);
a feedforward compensation device (12) configured to determine the feedforward compensation value (rf) from a measurement value (do) obtained from the straightener (200) using a predictive model (Mp); and
a learning device (13) configured to perform machine learning on the prediction model (Mp) using teaching data (Ds), wherein the learning device (13):
acquires at least one first combination (Cm1) including the target curvature (qr), the operation amount (r) corresponding to the target curvature (qr), the measurement value (do), and the straightening curvature (q) corresponding to both the measurement value (do) and the operation amount (r); and
adds at least one second combination (Cm2) in the at least one first combination (Cm1) to the teaching data (Ds), the at least one second combination (Cm2) including the measurement value (do) and the operation amount (r) when an absolute value of the error (eq) is smaller than a first reference value ($\alpha$).

Configuration 7

A method for controlling a straightener (200), the method determining a feedforward compensation value (rf) corresponding to a feedback operation amount (rb) to the straightener (200) such that a straightening curvature (q) of a wire (Wr) straightened by the straightener (200) approaches a target curvature (qr),
the straightener (200) including:
a wire supply unit (Bn) including the wire (Wr) that is wound;
a plurality of rollers (Ro1 to Ro7) that are alternately disposed so as to sandwich the wire (Wr) drawn out from the wire supply unit (Bn) and that are configured to press the wire (Wr); and
a wire moving unit (Mu) configured to pull out the wire (Wr) from the wire supply unit (Bn) to cause the wire (Wr) to pass through the plurality of rollers (Ro1 to Ro7),
the straightening curvature (q) being a curvature of a part of the wire (Wr) that has passed through the plurality of rollers (Ro1 to Ro7),
the feedback operation amount (rb) being determined by a feedback control means (110) based on an error (eq) between the target curvature (qr) and the straightening curvature (q),
a sum of the feedback operation amount (rb) and the feedforward compensation value (rf) being output to the straightener (200) as an operation amount (r),
the method comprising:
determining the feedforward compensation value (rf) from a measurement value (do) obtained from the straightener (200), using a predictive model (Mp), and
performing machine learning on the prediction model (Mp) using teaching data (Ds),
wherein the performing the machine learning includes:
acquiring at least one first combination (Cm1) including the target curvature (qr), the operation amount (r) corresponding to the target curvature (qr), the measurement value (do), and the straightening curvature (q) corresponding to both the measurement value (do) and the operation amount (r); and
adding at least one second combination (Cm2) in the at least one first combination (Cm1) to the teaching data (Ds), the at least one second combination (Cm2) including the measurement value (do) and the operation amount (r) when an absolute value of the error (eq) is smaller than a first reference value (q).

The embodiments disclosed herein are also planned to be implemented in appropriate combination within a range not contradictory. It should be considered that the disclosed embodiments are illustrative and non-restrictive in every respect. The scope of the present invention is defined by not the description above, but the claims, and it is intended that all modifications within the meaning and scope equivalent to the claims are included in the present invention.

Although the embodiment of the present invention has been described, it should be considered that the disclosed embodiment is an example in all respects and not restrictive. The scope of the present invention is indicated by the claims, and it is intended that all modifications within the meaning and scope of the claims are included in the present invention.

What is claimed is:

1. A control device of a straightener, the control device comprising:
a processor configured to determine a feedforward compensation value corresponding to a feedback operation amount of the straightener such that a straightening curvature of a wire straightened by the straightener approaches a target curvature,
wherein the straightener includes:
a winding axis about which the wire is wound;
a plurality of rollers that are alternately disposed so as to sandwich and press the wire that is drawn from the winding axis; and
a motor configured to draw the wire from the winding axis through the plurality of rollers,
wherein the straightening curvature is a curvature of a first part of the wire that has passed through the plurality of rollers,
wherein the feedback operation amount is determined by the processor based on an error between the target curvature and the straightening curvature,
wherein a sum of the feedback operation amount and the feedforward compensation value is output by the processor to the straightener as an operation amount, and
wherein the processor of the control device is configured to:
determine the feedforward compensation value from a measurement value obtained from the straightener, using a predictive model; and
perform a machine learning on the predictive model using teaching data by:
acquiring at least one first combination including the target curvature, the operation amount corresponding to the target curvature, the measurement value, and the straightening curvature corresponding to both the measurement value and the operation amount; and
adding at least one second combination in the at least one first combination to the teaching data, the at least one second combination including the measurement value and the operation amount when an absolute value of the error is smaller than a first reference value.

2. The control device according to claim 1, wherein
the operation amount changes at least one of positions of the plurality of rollers and a moving speed of the wire that is drawn from the winding axis, and
wherein the processor of the control device acquires, from the measurement value, at least one of:
the moving speed of the wire that is drawn from the winding axis;
a position of the first part;
a position of a second part of the wire before the wire is pressed by the plurality of rollers, a dimension of the second part of the wire, and a curvature of the second part of the wire;
a winding position of the wire in the winding axis; or
a position of each of the plurality of rollers, a radius of each of the plurality of rollers, a pitch of the plurality of rollers, and a pressure applied by each of the plurality of rollers.

3. The control device of the straightener according to claim 1, wherein the processor of the control device is configured to
calculate an average value of operation amounts when an absolute value of the measurement value is smaller than a second reference value in the teaching data; and
approximate a relationship between the measurement value and the feedforward compensation value that is a difference between the operation amount and the average value, as a function in which the feedforward compensation value is set to an objective variable while the measurement value is set to an explanatory variable, the relationship being expressed by the predictive model,
wherein in third combinations, the absolute value of the measurement value is larger than the second reference value in the at least one first combination,
wherein in fourth combinations, the absolute value of the measurement value is larger than the second reference value in the at least one second combination, and
wherein the processor of the control device ends the machine learning when a ratio of a number of the fourth combinations to a number of the third combinations is larger than a third reference value.

4. The control device according to claim 3, wherein the processor of the control device resumes the machine learning when the ratio is smaller than the third reference value.

5. The control device according to claim 1, wherein the processor of the control device is configured to
calculate an average value of operation amounts when an absolute value of the measurement value is smaller than a second reference value in the teaching data; and
approximate a relationship between the measurement value and the operation amount, as a function in which the operation amount is set to an objective variable while the measurement value is set to an explanatory variable, the relationship being expressed by the predictive model,
wherein in third combinations, the absolute value of the measurement value is larger than the second reference value in the at least one first combination,
wherein in fourth combinations, the absolute value of the measurement value is larger than the second reference value in the at least one second combination, and
wherein the processor of the control device is further configured to:
end the machine learning when a ratio of a number of the fourth combinations to a number of the third combinations is larger than a third reference value, and
determine a value obtained by subtracting the average value from the operation amount predicted from the measurement value by the predictive model as the feedforward compensation value.

6. The control device according to claim 1, wherein the motor comprises a servomotor and an encoder.

7. A control system that outputs a sum of a feedback operation amount to a straightener and a feedforward compensation value as an operation amount to the straightener such that a straightening curvature of a wire straightened by the straightener approaches a target curvature,
wherein the straightener includes:
a winding axis around which the wire is wound; and
a plurality of rollers that are alternately disposed so as to sandwich and press the wire that is drawn from the winding axis; and
a motor configured to draw the wire from the winding axis through the plurality of rollers,
wherein the straightening curvature is a curvature of a part of the wire that has passed through the plurality of rollers,
wherein the control system comprises:
a first processor configured to determine the feedback operation amount based on an error between the target curvature and the straightening curvature;
a second processor configured to determine the feedforward compensation value from a measurement value obtained from the straightener, using a predictive model; and
a third processor configured to perform a machine learning on the predictive model using teaching data by:
acquiring at least one first combination including the target curvature, the operation amount corresponding to the target curvature, the measurement value, and the straightening curvature corresponding to both the measurement value and the operation amount; and
adding at least one second combination in the at least one first combination to the teaching data, the at least one second combination including the measurement value and the operation amount when an absolute value of the error is smaller than a first reference value.

8. The control system according to claim 7, wherein the motor comprises a servomotor and an encoder.

9. A method for controlling a straightener, the method comprising:
determining a feedforward compensation value corresponding to a feedback operation amount of the straightener such that a straightening curvature of a wire straightened by the straightener approaches a target curvature,
wherein the straightener includes:
a winding axis around which the wire is wound;
a plurality of rollers that are alternately disposed so as to sandwich and press the wire drawn from the winding axis; and
a motor configured to draw the wire from the winding axis through the plurality of rollers,
wherein the straightening curvature is a curvature of a part of the wire that has passed through the plurality of rollers,
wherein the feedback operation amount is determined based on an error between the target curvature and the straightening curvature,
wherein a sum of the feedback operation amount and the feedforward compensation value is output to the straightener as an operation amount, and
wherein the method comprises:
determining the feedforward compensation value from a measurement value obtained from the straightener, using a predictive model; and
performing a machine learning on the predictive model using teaching data, wherein performing the machine learning includes:
acquiring at least one first combination including the target curvature, the operation amount corresponding to the target curvature, the measurement value, and the straightening curvature corresponding to both the measurement value and the operation amount; and
adding at least one second combination in the at least one first combination to the teaching data, the at least one second combination including the measurement value and the operation amount when an absolute value of the error is smaller than a first reference value.

10. The method according to claim 9, wherein the motor comprises a servomotor and an encoder.

* * * * *